United States Patent
Faxér et al.

(10) Patent No.: US 11,997,703 B2
(45) Date of Patent: May 28, 2024

(54) ENCODING OF REMOTE INTERFERENCE MANAGEMENT (RIM) REFERENCE SIGNAL (RS) IDENTIFIER (ID)

(71) Applicant: Telefonaktiebolaget LM Ericsson (publ), Stockholm (SE)

(72) Inventors: Sebastian Faxér, Stockholm (SE); Filip Barac, Huddinge (SE); Jingya Li, Gothenburg (SE); Mårten Sundberg, Årsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 424 days.

(21) Appl. No.: 17/279,378

(22) PCT Filed: Sep. 27, 2019

(86) PCT No.: PCT/SE2019/050938
§ 371 (c)(1),
(2) Date: Mar. 24, 2021

(87) PCT Pub. No.: WO2020/067989
PCT Pub. Date: Apr. 2, 2020

(65) Prior Publication Data
US 2021/0400676 A1   Dec. 23, 2021

Related U.S. Application Data

(60) Provisional application No. 62/737,350, filed on Sep. 27, 2018.

(51) Int. Cl.
*H04W 72/541* (2023.01)
*H04L 5/00* (2006.01)
*H04W 72/0446* (2023.01)

(52) U.S. Cl.
CPC ......... *H04W 72/541* (2023.01); *H04L 5/0048* (2013.01); *H04W 72/0446* (2013.01)

(58) Field of Classification Search
CPC ............ H04W 72/541; H04W 72/0446; H04L 5/0048
See application file for complete search history.

(56) References Cited

U.S. PATENT DOCUMENTS

| 2017/0280336 A1 | 9/2017 | Sun et al. |
| 2021/0352494 A1* | 11/2021 | Ren .................. H04W 52/243 |
| 2022/0053556 A1* | 2/2022 | Cao .................... H04W 24/08 |

FOREIGN PATENT DOCUMENTS

| JP | 2015515160 A | 5/2015 |
| WO | 2018080739 A1 | 5/2018 |

OTHER PUBLICATIONS

Japanese Office Action and English Summary translation dated Apr. 15, 2022 for Japanese Patent Application No. 2021-517337; consisting of 6 pages.

(Continued)

*Primary Examiner* — Won Tae C Kim
(74) *Attorney, Agent, or Firm* — Weisberg I.P. Law, P.A.

(57) ABSTRACT

A method, system and apparatus are disclosed. In one or more embodiments, a network node for remote interference identification is provided. The network node includes processing circuitry configured to cause transmission of at least one reference signal, RS, based at least in part on at least one RS sequence and at least one time occasion. An identifier of the network node is mapped to the at least one RS sequence and the at least one time occasion.

22 Claims, 17 Drawing Sheets

(56) References Cited

OTHER PUBLICATIONS

3GPP TSG RAN WG1 Meeting #94 R1-1809973; Title: Draft summary on Study on NR-RIM; Agenda Item: 7.2.5; Source: CMCC; Document for: For information; Date and Location: Aug. 20-24, 2018, Gothenburg, Sweden; consisting of 30 pages.
Australian Examination Report No. 1 dated Dec. 14, 2021 for Application No. 2019347693, consisting of 3 pages.
International Search Report and Written Opinion dated Dec. 16, 2019 for International Application No. PCT/SE2019/050938 filed Sep. 27, 2019, consisting of 9-pages.
3GPP TSG-RAN WG1 Meeting #94 Tdoc R1-1808823; Title: On mechanism for identifying strong gNB interferers; Agenda Item: 7.2.5.2; Source: Ericsson; Document for: Discussion, Decision; Date and Location: Aug. 20-24, 2018, Goteborg, Sweden, consisting of 6-pages.
3GPP TSG RAN WG1 Meeting #94 R1-1808703; Title: Remote Interference Management Schemes; Agenda Item: 7.2.5.1; Source: Intel Corporation; Document for: Discussion and decision; Date and Location: Aug. 20-24, 2018, Gothenburg, Sweden, consisting of 7-pages.
3GPP TSG RAN WG1 Meeting #94 R1-1808842; Title: Discussion on RS design for RIM; Agenda Item: 7.2.5.3; Source: CMCC; Document for: Discussion; Date and Location: Aug. 20-24, 2018, Gothenburg, Sweden, consisting pf 12-pages.
3GPP TSG RAN Meeting #81 RP-181831; Title: Status Report of SI on remote interference management for NR; Agenda Item: 9.3.9; Source: CMCC; Document for: Approval; Date and Location: Sep. 10-13, 2018, Gold Coast, Australia, consisting of 8-pages.
Chinese Office Action and English Summary dated Jul. 8, 2023 for Application 201980078123.8, consisting of 11 pages.
Japanese Office Action and English Summary dated Mar. 29, 2024 for Application No. 2023-068701, consisting of 6 pages.
3GPP TSG RAN WG1 Meeting #94 R1-1808325; Title: Consideration of RIM framework and mechanisms for improving network robustness; Source: ZTE; Agenda Item: 7.2.5.1; Document for: Discussion and Decision; Location and Date: Gothenburg, Sweden Aug. 20-24, 2018, consisting of 9 pages.

* cited by examiner

ENCODING OF REMOTE INTERFERENCE MANAGEMENT (RIM) REFERENCE SIGNAL (RS) IDENTIFIER (ID)

CROSS-REFERENCE TO RELATED APPLICATIONS

This application is a Submission Under 35 U.S.C. § 371 for U.S. National Stage Patent Application of International Application No.: PCT/SE2019/050938, filed Sep. 27, 2019 entitled "ENCODING OF REMOTE INTERFERENCE MANAGEMENT (RIM) REFERENCE SIGNAL (RS) IDENTIFIER (ID)," which claims priority to U.S. Provisional Application No. 62/737,350, filed Sep. 27, 2018, entitled "ENCODING OF REMOTE MANAGEMENT REFERENCE SIGNAL IDENTIFIER," the entireties of both of which are incorporated herein by reference.

TECHNICAL FIELD

The present disclosure relates to wireless communications, and in particular, to remote interference identification and interference mitigation based on the identification.

BACKGROUND

NR Frame Structure

The next generation mobile wireless communication system (5G) or new radio (NR), supports a diverse set of use cases and a diverse set of deployment scenarios. The latter includes deployment at both low frequencies (100 s of MHz), similar to existing Long Term Evolution (LTE), and very high frequencies (mm waves in the tens of GHz).

Similar to LTE, NR uses OFDM (Orthogonal Frequency Division Multiplexing) in the downlink (e.g., from a network node such as a gNB, eNB, or base station, to a wireless device (WD) such as a user equipment (UE)). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing (SCS) values are supported in NR. The supported subcarrier spacing values (also referred to as different numerologies) are given by $\Delta f=(15\times 2^{\alpha})$ kHz where $\alpha \in (0,1,2,3,4)$. $\Delta f=15$ kHz is the basic (or reference) subcarrier spacing that is also used in LTE.

In the time domain, downlink (from network node to the wireless device) and uplink (from the wireless device to the network node) transmissions in NR may be organized into equally-sized subframes of 1 ms each, similar to LTE. A subframe is further divided into multiple slots of equal duration. The slot length for subcarrier spacing $\Delta f=(15\times 2^{\alpha})$ kHz is $\frac{1}{2}^{\alpha}$ ms. There is only one slot per subframe at $\Delta f=15$ kHz and the slot consists of 14 OFDM symbols.

Downlink transmissions are dynamically scheduled, i.e., in each slot the network node (e.g., gNB) transmits downlink control information (DCI) about which WD data is to be transmitted to and which resource blocks in the current downlink slot the data is transmitted on. This control information is typically transmitted in the first one or two OFDM symbols in each slot in NR. The control information is carried on the Physical Downlink Control Channel (PDCCH) and data is carried on the Physical Downlink Shared Channel (PDSCH). A WD first detects and decodes PDCCH and if a PDCCH is decoded successfully, the WD then decodes the corresponding PDSCH based on the decoded control information in the PDCCH.

In addition to PDCCH and PDSCH, there are also other channels and reference signals transmitted in the downlink.

Uplink data transmissions, carried on Physical Uplink Shared Channel (PUSCH), are also dynamically scheduled by the network node (e.g., gNB) by transmitting a DCI. In case of TDD operation, the Downlink Control Information (DCI) (which is transmitted in the Downlink (DL) region) always indicates a scheduling offset so that the PUSCH is transmitted in a slot in the Uplink (UL) region.

Interference Protection in TDD Networks

Wireless cellular networks are built up of cells, each cell defined by a certain coverage area of a network node such as a radio base station (BS). The network node(s) communicate with WD such as terminals/user equipment (UE) in the network wirelessly. The communication is carried out in either paired or unpaired spectrum. In case of paired spectrum, the DL and UL directions are separated in frequency, called Frequency Division Duplex (FDD). In case of unpaired spectrum, the DL and UL use the same spectrum, called Time Division Duplex (TDD). As the name implies, the DL and UL are separated in the time domain, using typically a guard period (GP) between them. The guard period serves several purposes. Most essentially, the processing circuitry at the network node and WD needs sufficient time to switch between transmission and reception, however, this is typically a fast procedure and does not significantly contribute to the requirement of the GP size. In addition, the GP must be sufficiently large to allow a WD to receive a (time-delayed) DL grant scheduling the UL and transmit the UL signal with proper timing advance (compensating for the propagation delay) such that it is received in the UL part of the frame at the network node. Thus, the GP should be larger than two times the propagation time towards a WD at the cell edge, otherwise, the UL and DL signals in the cell will interfere. Because of this, the GP is typically chosen to depend on the cell size such that larger cells (i.e., larger inter-site distances) have a larger GP and vice versa.

Additionally, the guard period is used to reduce DL-to-UL interference between network nodes by allowing a certain propagation delay between cells without having the DL transmission of a first network node enter the UL reception of a second network node. In a typical macro network, the DL transmission power can be on the order of 20 dB larger than the UL transmission power. Hence, if the UL of one cell is interfered by the DL of other cells, referred to as cross-link interference, the UL performance can be seriously degraded. Because of the large transmit power discrepancy between UL and DL, cross-link interference can be detrimental to system performance not only for the co-channel case (where DL interferes UL on the same carrier) but also for the adjacent channel case (where DL of one carrier interferes with UL on an adjacent carrier). Because of this, TDD macro networks are typically operated in a synchronized fashion where the symbol timing is aligned and a semi-static TDD UL/DL pattern is used which is the same for all the cells in the network (NW). Typically, operators with adjacent TDD carriers also synchronize their TDD UL/DL patterns to avoid adjacent channel cross-link interference.

The principle of applying a GP to avoid DL-to UL interference between network nodes is shown in FIG. 2 where a victim network node 1 (V) is being (at least potentially) interfered by an aggressor network node 2 (A).

The aggressor network node sending a DL signal to a WD 3 in its cell, the DL signal also reaching the victim network node 1 (the propagation loss is not enough to protect it from the signals of A). The DL signal is propagated a distance (d) and due to propagation delay, the experienced frame structure alignment of A at V is shifted/delayed r second, proportional to the propagation distance d. As can be seen from FIG. 2, although the DL part of the aggressor network node 2 (A) is delayed, it does not enter the UL region of the victim network node 1 (V) due to the guard period used. The system design is able to avoid interference in this example.

It could be noted that the terminology victim and aggressor is only used here to illustrate why typical TDD systems are designed as they are. The victim can also act as an aggressor and vice versa since channel reciprocity exists between the network nodes.

Uplink-Downlink Configurations in TDD

In TDD, some subframes/slots are allocated for uplink transmissions and some subframes/slots are allocated for downlink transmissions. The switch between downlink and uplink occurs in the so-called special subframes (LTE) or flexible slots (NR).

In LTE, seven different uplink-downlink configurations are provided, as illustrated in Table 1.

TABLE 1

LTE uplink-downlink configurations (from Third Generation Partnership Project (3GPP) Technical Specification (TS) 36.211, Table 4.2-2)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period (and hence the number of symbols for DwPTS (downlink transmission in a special subframe) and UpPTS (uplink transmission in a special subframe) in the special subframe) can also be configured from a set of possible selections.

NR, on the other hand, provides many different uplink-downlink configurations. There are 10 to 320 slots per radio frame (where each radio frame has a duration of 10 ms) depending on subcarrier spacing. The OFDM symbols in a slot are classified as "downlink" (denoted as "D"), "flexible" (denoted as "X"), or "uplink" (denoted as "U"). A semi-static TDD UL-DL configuration may be used where the TDD configuration is Radio Resource Control (RRC) configured using the Information Element (IE) TDD-UL-DL-ConfigCommon:

```
TDD-UL-DL-ConfigCommon ::=          SEQUENCE {
    -- Reference SCS used to determine the time domain boundaries in the UL-DL
pattern which must be common across all subcarrier specific
    -- virtual carriers, i.e., independent of the actual subcarrier spacing using for data
transmission.
    -- Only the values 15 or 30 kHz (<6GHz), 60 or 120 kHz (>6GHz) are applicable.
    -- Corresponds to L1 parameter 'reference-SCS' (see 38.211, section FFS_Section)
        referenceSubcarrierSpacing      SubcarrierSpacing
                                        OPTIONAL,
    -- Periodicity of the DL-UL pattern. Corresponds to L1 parameter 'DL-UL-
transmission-periodicity' (see 38.211, section FFS_Section)
        dl-UL-TransmissionPeriodicity   ENUMERATED {ms0p5, ms0p625, ms1,
ms1p25, ms2, ms2p5, ms5, ms10}      OPTIONAL,
    -- Number of consecutive full DL slots at the beginning of each DL-UL pattern.
    -- Corresponds to L1 parameter 'number-of-DL-slots' (see 38.211, Table 4.3.2-1)
        nrofDownlinkSlots               INTEGER (0..maxNrofSlots)
                                        OPTIONAL,
    -- Number of consecutive DL symbols in the beginning of the slot following the
last full DL slot (as derived from nrofDownlinkSlots).
    -- If the field is absent or released, there is no partial-downlink slot.
    -- Corresponds to L1 parameter 'number-of-DL-symbols-common' (see 38.211,
section FFS_Section).
        nrofDownlinkSymbols             INTEGER (0..maxNrofSymbols-1)
                                        OPTIONAL, -- Need R
    -- Number of consecutive full UL slots at the end of each DL-UL pattern.
    -- Corresponds to L1 parameter 'number-of-UL-slots' (see 38.211, Table 4.3.2-1)
```

```
    nrofUplinkSlots              INTEGER (0..maxNrofSlots)
                                                OPTIONAL,
    -- Number of consecutive UL symbols in the end of the slot preceding the first full
UL slot (as derived from nrofUplinkSlots).
    -- If the field is absent or released, there is no partial-uplink slot.
    -- Corresponds to L1 parameter 'number-of-UL-symbols-common' (see 38.211,
section FFS_Section)
    nrofUplinkSymbols            INTEGER (0..maxNrofSymbols-1)
                                        OPTIONAL   -- Need R
```

That is, a TDD periodicity of P ms is defined, and it can be arbitrarily specified how many DL and UL slots are fitted into this TDD periodicity, as well as the size of the GP. Additionally, it's possible to configure two concatenated periodicities $P_1$ and $P_2$, each with a separate number of DL/UL slots, so as to create a total TDD periodicity of $P_1+P_2$ ms.

In NR, the SS Block (SSB) periodicity is fixed to the allowed values, 5, 10, 20, 40, 80 and 160 ms. Due to that, the SSBs in initial access procedures have a default periodicity of 20 ms, all TDD periodicities must divide 20 ms evenly. For non-concatenated TDD periodicities, the value range for P is {0.5, 0.625, 1, 1.25, 2, 2.5, 3, 4, 5, 10} ms, which all except for the value of 3 ms (which is then not allowed to be selected for a non-concatenated TDD periodicity, only as part of a concatenated TDD periodicity) divide 20 ms evenly. For concatenated TDD periodicities, this puts constraints on which periodicities $P_1$ and $P_2$ that can be configured.

Or alternatively, the slot format can be dynamically indicated with a Slot Format Indicator (SFI) conveyed with DCI Format 2_0. Regardless if dynamic or semi-static TDD configuration is used in NR. the number of UL and DL slots, as well as the guard period (the number of UL and DL symbols in the flexible slot(s)) may be almost arbitrarily configured within the TDD periodicity. This allows for very flexible uplink-downlink configurations.

Atmospheric Ducting

In certain weather conditions and in certain regions of the world a ducting phenomenon can happen to wireless signals in the atmosphere. The appearance of the duct is dependent on for example temperature and humidity and when it appears it can "channel" the signal to help it propagate a significantly longer distance than if the duct was not present. An atmospheric duct is a layer in which a rapid decrease in the refractivity of the lower atmosphere (the troposphere) occurs. In this way, atmospheric ducts can trap the propagating signals in the ducting layer, instead of radiating out in space. Thus, most of the signal energy propagates in the ducting layer, which acts as a waveguide. Therefore, trapped signals can propagate through beyond-line-of-sight distances with relatively low path loss, sometimes even lower than in line-of-sight propagation.

A ducting event is typically temporary and can have a time duration from a couple of minutes to several hours.

Combining the knowledge of the TDD system design and the presence of an atmospheric duct, the distance d in FIG. 2, where an aggressor network node 2 can interfere with a victim network node 1, is greatly increased. Since the phenomenon is only appearing in certain parts of the world under certain conditions, this has typically not been considered in designs of cellular systems using unpaired spectrum. The implication is that a DL transmission can suddenly enter the UL region as interference (I), which is illustrated in FIG. 3.

The figure illustrates a single radio link, but when the atmospheric ducting occurs, a BS can be interfered by thousands of BS. The closer the aggressor network node 2 the shorter the propagation delay, and the stronger the interference. Hence, the interference experienced at the victim network node 1 typically has a slope characteristic, as illustrated in FIG. 4.

One manner of detecting interference between network nodes is for the victim network node 1 (i.e., a network node that has detected that it is being interfered due to atmospheric ducting) to send a specific reference signal that can be detected by an aggressor network node 2. The aggressor network node 2 can, in this case, adapt its transmission to avoid the interference situation. One such adaptation the aggressor network node 2 can perform is to, for example, blank its downlink transmission, effectively increasing the guard period.

It can be noted that due to channel reciprocity, it is likely that an aggressor network node 2 is also the victim network node 1 of other network nodes transmission as well.

RI Mitigation Framework

In order to provide robustness in the presence of radio interference (RI), the network nodes (e.g., gNBs) in the network can apply an adaptive distributed Remote Interference Management (RIM) mitigation scheme, for instance using the framework described below and illustrated in FIG. 6. Basically, upon detecting the presence of RI, the victim network node 1 transmits a RIM-reference signal (RS) which potential aggressors can detect. Upon detection of an RS, the aggressor network node 2 can apply a RIM mitigation mechanism such as adapting the GP. The aggressor network node 2 then informs the victim network, for example, through backhaul communications that it has received the RIM-RS. The victim network node 1, in turn, continues to transmit the RIM-RS to continue to probe the strength of the ducting channel. After the aggressor network node 2 no longer detects the RIM-RS transmitted by the victim network node 1, the aggressor network node 2 restores the original GP configuration and informs the victim network node 1 (e.g., gNB) via backhaul so that the victim network node 1 (e.g., gNB) can suspend its RIM-RS transmission. Table 2 illustrates the steps performed in the RIM framework.

TABLE 2

| Step | Action |
| --- | --- |
| 0 | Atmospheric ducting phenomenon starts and remote interference appears |
| 1 | i) Victim network node 1 experiences "sloping" like IoT increase and start RS transmission, OR, A set of network nodes (e.g., gNBs) might use the same RS, which may carry the set ID<br>ii) Aggressor network node 2 starts monitoring RS as configured by OAM or when it experiences remote interference with "sloping" IoT increase |

TABLE 2-continued

| Step | Action |
|---|---|
| 2 | Upon reception of RS, Aggressor network node 2 informs the set of victim network node 1 (e.g., gNB(s)) the reception of RS through backhaul and apply interference mitigation scheme Message exchange in Step 2 could include other information, which is under further study. |
| 3 | Upon "disappearance" of RS, Aggressor network node 2 informs the set of Victim network nodes 1 (gNB(s)) the "disappearance" of RS through backhaul and restore the original configuration |
| 4 | Victim network node 1 stops RS transmission upon the reception of the "disappearance of RS" info through backhaul |

SUMMARY

Some embodiments advantageously provide methods, systems, and apparatuses for remote interference identification and interference mitigation based on the identification.

The disclosure provides a framework for flexibly configuring the RIM-RS transmission occasions and RIM-RS sequences based on allocating a network node (e.g., gNB) set ID and a reference signal transmission framework configuration.

One aspect of the disclosure utilizes that all possible NR TDD configurations have an integer number of periods over 20 ms, and therefore a radio frame pair, containing two 10 ms radio frames, is used as a reference point for mapping the time occasion of the reference signal transmission.

Further, while the interference problem is described to stem from atmospheric ducting, the same situation could occur in a network where a too small guard period has been selected for the deployment. Hence, solutions in the instant disclosure are also applicable to this case, although not considered a typical scenario.

According one aspect of the disclosure, a network node for remote interference identification is provided. The network node includes processing circuitry configured to cause transmission of at least one reference signal, RS, based at least in part on at least one RS sequence and at least one time occasion where an identifier of the network node is mapped to the at least one RS sequence and the at least one time occasion.

According to one or more embodiments of the disclosure, the network node is a victim network node that receives interference from downlink transmissions of another network node. According to one or more embodiments of the disclosure, the identifier is identifiable from the at least one RS sequence and the at least one time occasion. According to one or more embodiments of the disclosure, the processing circuitry is further configured to detect remote interference from another network node, the transmission of the at least one reference signal being in response to the detected remote interference.

According to one or more embodiments of the disclosure, the processing circuitry is further configured to, after the transmission of the at least one RS: determine whether remote interference is still being detected; if the determination is made that remote interference is still detected, cause at least one additional transmission of the at least one RS; and if the determination is made that remote interference is not being detected, cease transmission of the at least one RS. According to one or more embodiments of the disclosure, the at least one time occasion corresponds to at least one of: a radio frame pair where the at least one RS is transmitted, and a different time occasion within the radio frame pair for at least one of the at least one RS. According to one or more embodiments of the disclosure, the time occasion corresponds to at least one of: at least one slot where there is a switch between downlink transmission and uplink transmission, and a fixed time location within a slot.

According to one or more embodiments of the disclosure, the at least one RS sequence includes a plurality of RS sequences, and the at least one time occasion includes a plurality of time occasions. According to one or more embodiments of the disclosure, the identifier of the network node is identified by a plurality of bits. At least a first one of the plurality of bits corresponds to a first RS sequence of the plurality of RS sequences and a first time occasion of the plurality of time occasions. At least a second one of the plurality of bits corresponds to a second RS sequence of the plurality of RS sequences and a second time occasion of the plurality of time occasions. According to one or more embodiments of the disclosure, the at least one RS sequence is a same RS sequence and the at least one time occasion includes a plurality of time occasions.

According to another aspect of the disclosure, a first network node is provided. The first network node includes processing circuitry configured to receive at least one reference signal, RS, during at least one time occasion for remote interference identification where the at least one RS includes at least one RS sequence, and to determine an identifier of a second network node based at least in part on the at least one RS sequence and the at least one time occasion where the identifier of the second network node is mapped to the at least one RS sequence and the at least one time occasion.

According to one or more embodiments of the disclosure, the processing circuitry is further configured to perform at least one remote interference mitigation action based at least in part on the determined identifier of the second network node. According to one or more embodiments of the disclosure, the processing circuitry is further configured to, after the at least one remote interference mitigation action is performed: determine whether the at least one RS signal is detected; and if the determination is made that the at least one RS signal is not detected, modify the remote interference mitigation action. According to one or more embodiments of the disclosure, the first network node is an aggressor network node that causes interference at the second network node.

According to one or more embodiments of the disclosure, the identifier is identifiable from the at least one RS sequence and the at least one time occasion. According to one or more embodiments of the disclosure, the at least one time occasion corresponds to at least one of: a radio frame pair where the at least one RS is transmitted, and a different time occasion within the radio frame pair for at least one of the at least one RS. According to one or more embodiments of the disclosure, the time occasion corresponds to at least one of: at least one slot where there is a switch between downlink transmission and uplink transmission, and a fixed time location within a slot.

According to one or more embodiments of the disclosure, the at least one RS sequence includes a plurality of RS sequences and the at least one time occasion includes a plurality of time occasions. According to one or more embodiments of the disclosure, the identifier of the second network node is identified by a plurality of bits. At least a first one of the plurality of bits corresponds to a first RS sequence of the plurality of RS sequences and a first time occasion of the plurality of time occasions. At least a second one of the plurality of bits corresponds to a second RS sequence of the plurality of RS sequences and a second time occasion of the plurality of time occasions. According to one or more embodiments of the disclosure, the at least one RS sequence is a same RS sequence and the at least one time occasion includes a plurality of time occasions.

According to another aspect of the disclosure, a method implemented in a network node for remote interference identification is provided. Transmission of at least one reference signal, RS, is caused based at least in part on at least one RS sequence and at least one time occasion where an identifier of the network node is mapped to the at least one RS sequence and the at least one time occasion.

According to one or more embodiments of this aspect, the network node is a victim network node that receives interference from downlink transmissions of another network node. According to one or more embodiments of this aspect, the identifier is identifiable from the at least one RS sequence and the at least one time occasion. According to one or more embodiments of this aspect, remote interference from another network node is detected where the transmission of the at least one reference signal is in response to the detected remote interference.

According to one or more embodiments of this aspect, after the transmission of the at least one RS: a determination is made whether remote interference is still being detected; if the determination is made that remote interference is still detected, at least one additional transmission of the at least one RS is caused; and if the determination is made that remote interference is not being detected, transmission of the at least one RS is ceased. According to one or more embodiments of this aspect, the at least one time occasion corresponds to at least one of: a radio frame pair where the at least one RS is transmitted, and a different time occasion within the radio frame pair for at least one of the at least one RS. According to one or more embodiments of this aspect, the time occasion corresponds to at least one of: at least one slot where there is a switch between downlink transmission and uplink transmission, and a fixed time location within a slot.

According to one or more embodiments of this aspect, the at least one RS sequence includes a plurality of RS sequences and the at least one time occasion includes a plurality of time occasions. According to one or more embodiments of this aspect, the identifier of the network node is identified by a plurality of bits. At least a first one of the plurality of bits corresponds to a first RS sequence of the plurality of RS sequences and a first time occasion of the plurality of time occasions. At least a second one of the plurality of bits corresponds to a second RS sequence of the plurality of RS sequences and a second time occasion of the plurality of time occasions. According to one or more embodiments of this aspect, the at least one RS sequence is a same RS sequence and the at least one time occasion includes a plurality of time occasions.

According to another aspect of the disclosure, a method implemented by a first network node is provided. At least one reference signal, RS, is received during at least one time occasion for remote interference identification where the at least one RS includes at least one RS sequence. An identifier of a second network node is determined based at least in part on the at least one RS sequence and the at least one time occasion where the identifier of the second network node is mapped to the at least one RS sequence and the at least one time occasion.

According to one or more embodiments of this aspect, at least one remote interference mitigation action is performed based at least in part on the determined identifier of the second network node. According to one or more embodiments of this aspect, after the at least one remote interference mitigation action is performed: a determination is made whether the at least one RS signal is detected; and if the determination is made that the at least one RS signal is not detected, the remote interference mitigation action is modified. According to one or more embodiments of this aspect, the first network node is an aggressor network node that causes interference at the second network node.

According to one or more embodiments of this aspect, the identifier is identifiable from the at least one RS sequence and the at least one time occasion. According to one or more embodiments of this aspect, the at least one time occasion corresponds to at least one of: a radio frame pair where the at least one RS is transmitted, and a different time occasion within the radio frame pair for at least one of the at least one RS. According to one or more embodiments of this aspect, the time occasion corresponds to at least one of: at least one slot where there is a switch between downlink transmission and uplink transmission, and a fixed time location within a slot.

According to one or more embodiments of this aspect, the at least one RS sequence includes a plurality of RS sequences and the at least one time occasion includes a plurality of time occasions. According to one or more embodiments of this aspect, the identifier of the second network node is identified by a plurality of bits. At least a first one of the plurality of bits corresponds to a first RS sequence of the plurality of RS sequences and a first time occasion of the plurality of time occasions. At least a second one of the plurality of bits corresponds to a second RS sequence of the plurality of RS sequences and a second time occasion of the plurality of time occasions. According to one or more embodiments of this aspect, the at least one RS sequence is a same RS sequence and the at least one time occasion includes a plurality of time occasions.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
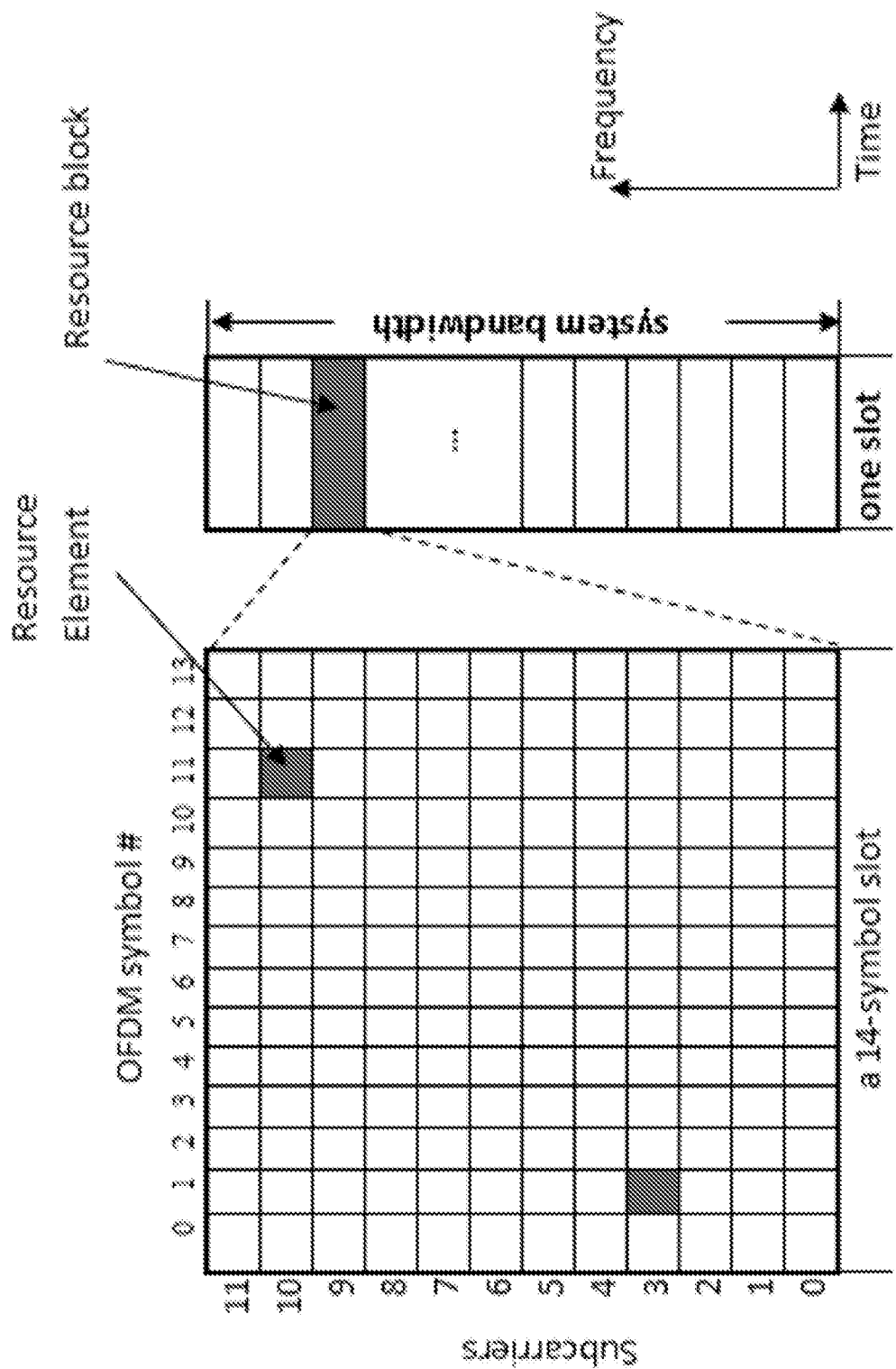
FIG. 1 is a diagram of a physical resource grid in NR.
Figure 2:
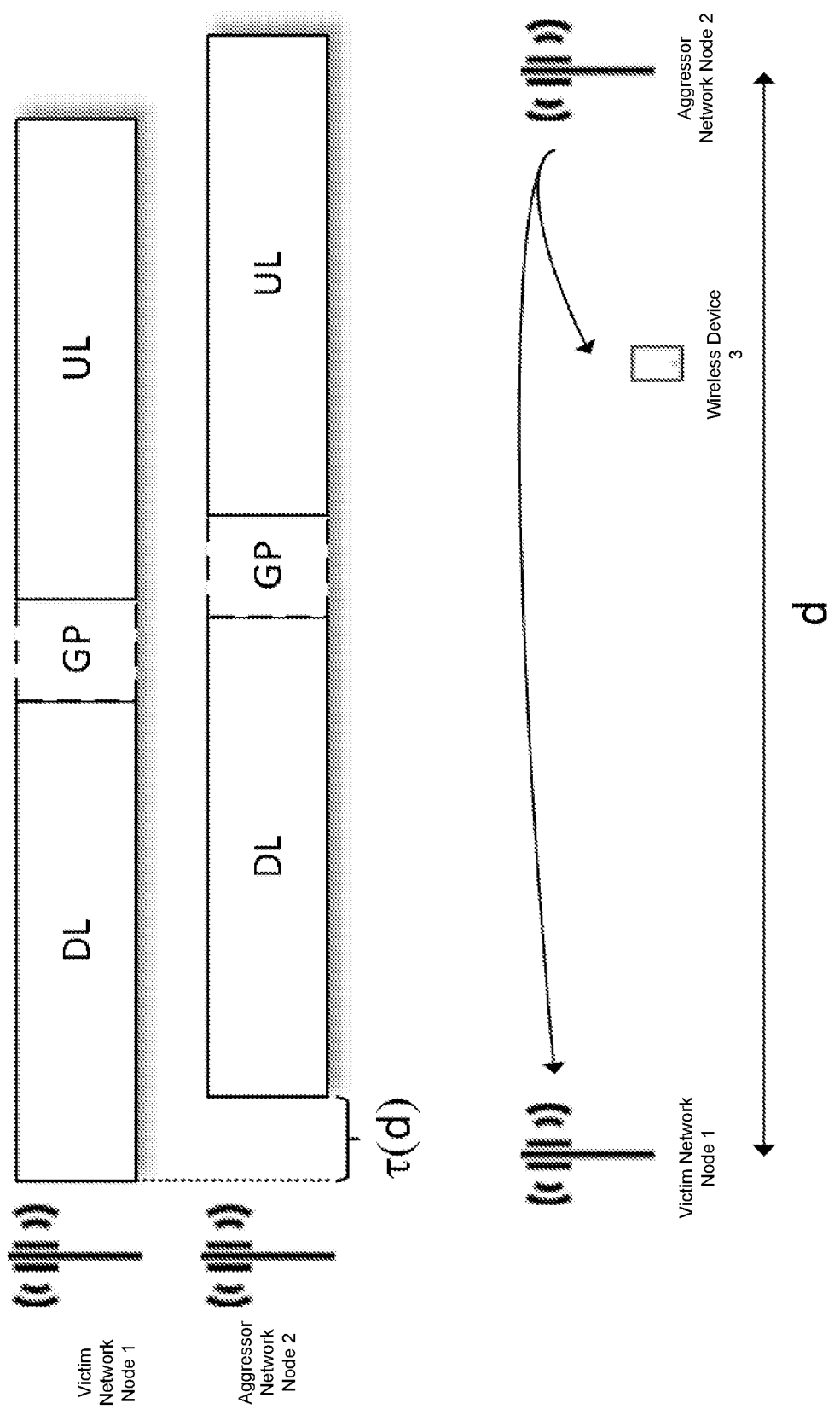
FIG. 2 is a diagram of a TDD guard period design.
Figure 3:
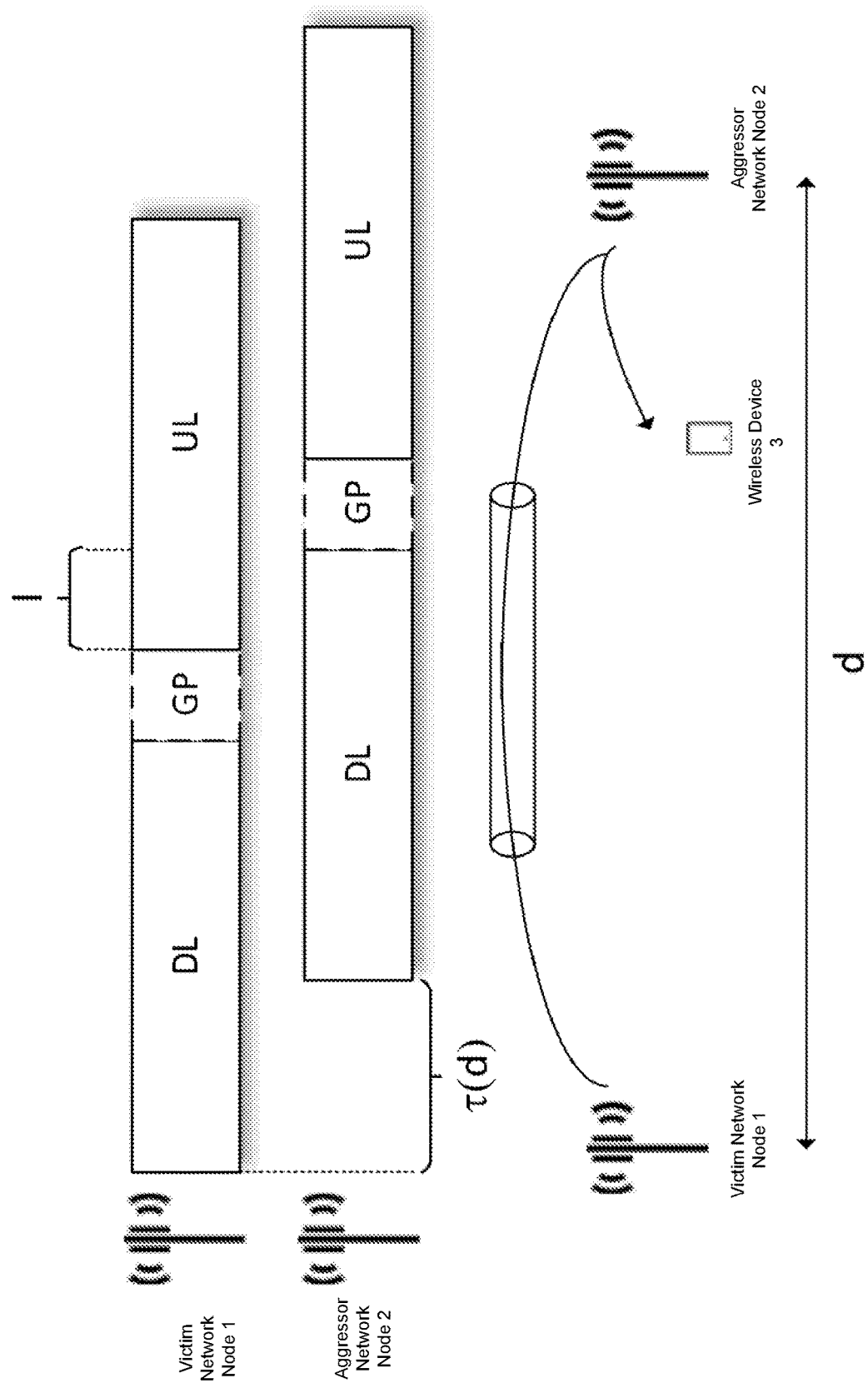
FIG. 3 is a diagram of downlink interference in the uplink region.
Figure 4:
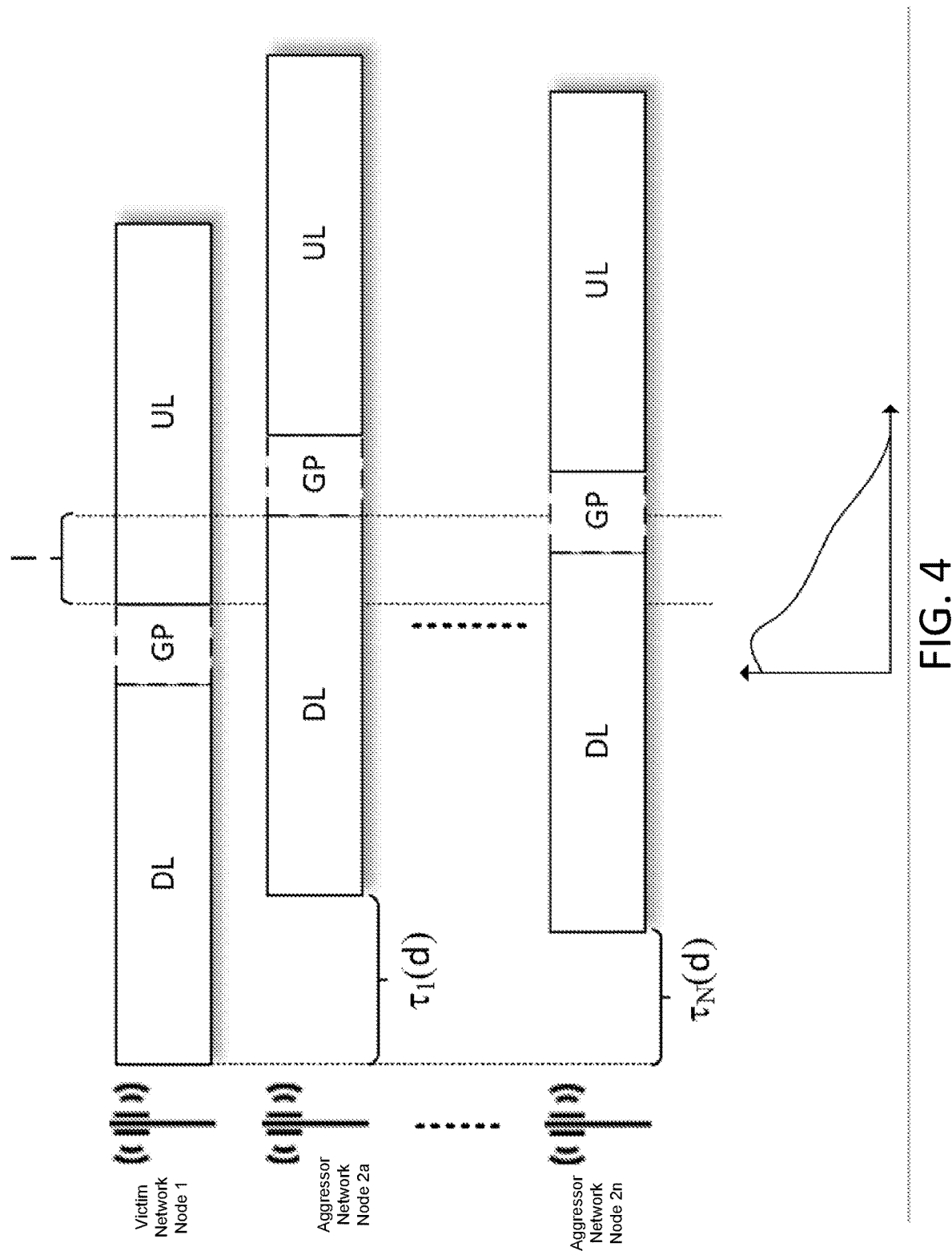
FIG. 4 is a diagram of interference characteristics in case of downlink to uplink interference.
Figure 5:
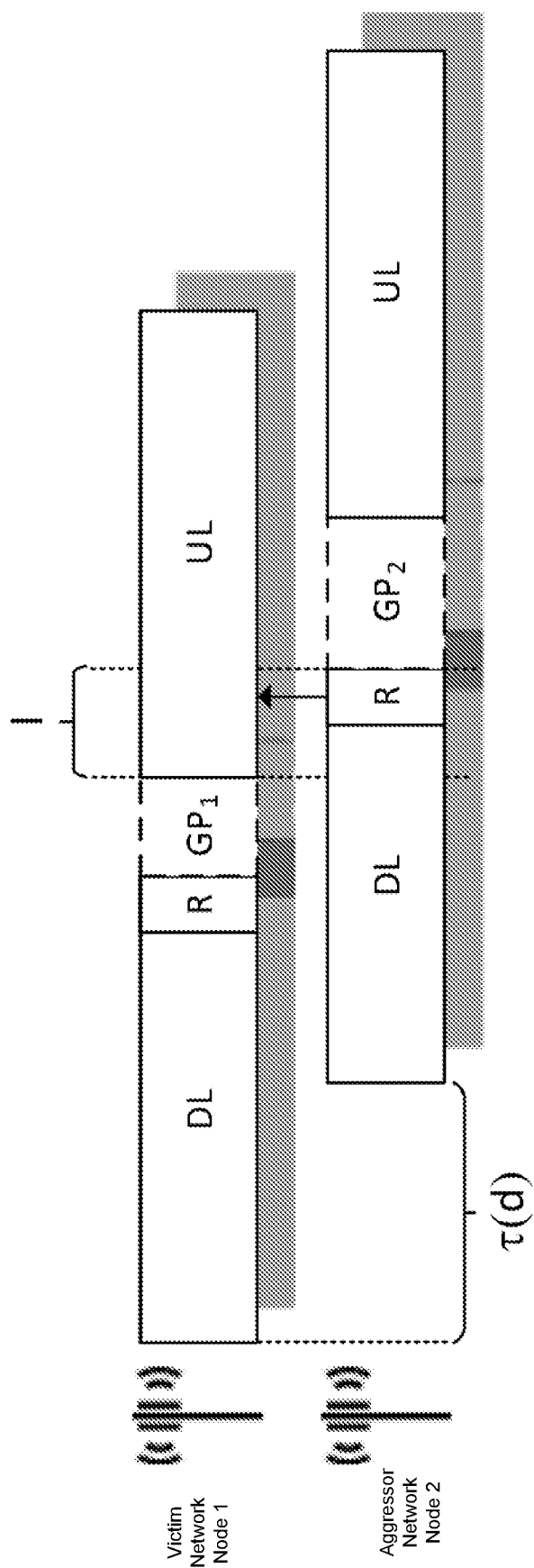
FIG. 5 is a diagram of RIM-RS transmission.
Figure 6:
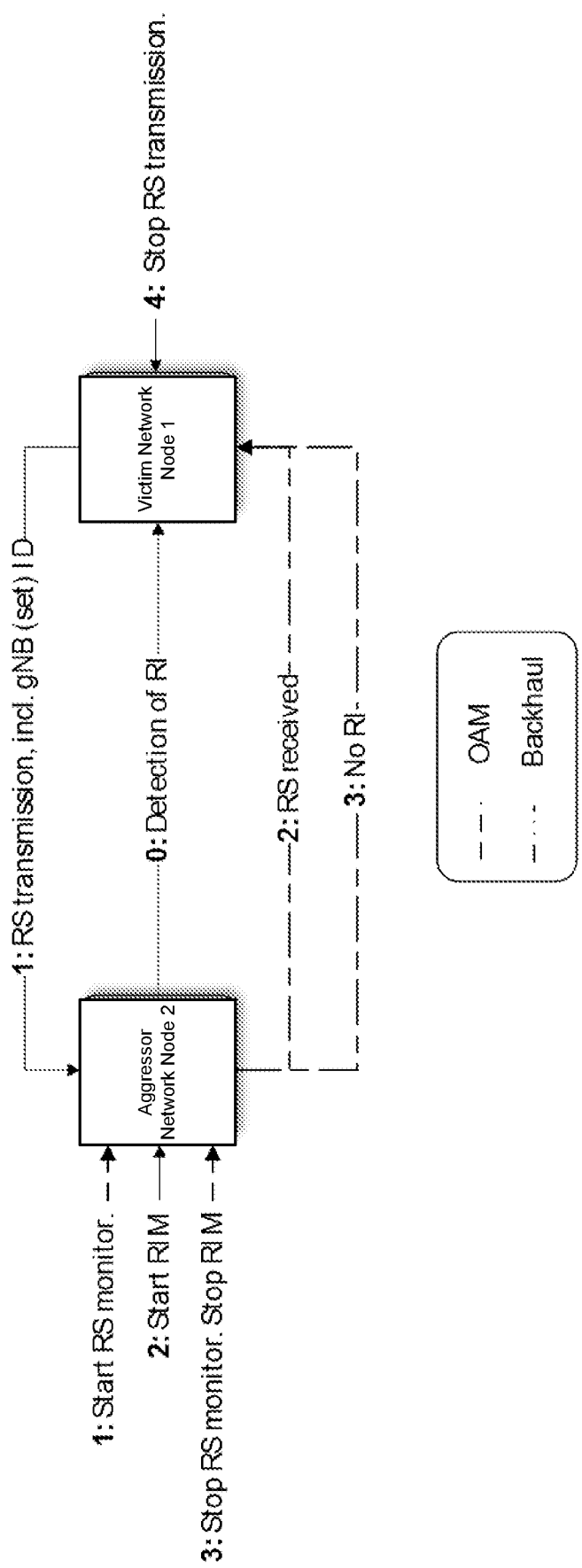
FIG. 6 is a diagram of an example RIM framework.

In the described RIM framework illustrated in FIG. 6, the RIM-RS transmission needs to convey an identifier/identity (ID) of the individual network node (e.g., gNB) or the set of network nodes (e.g., gNBs) that transmitted the RS, in order for the aggressor network node 2 (e.g., gNB) to establish a backhaul link to the victim(s) network nodes. However, existing systems do not define how such an ID can be conveyed based on the detected RS.

The instant disclosure solves at least a portion of a problem with existing systems by providing a framework for flexibly configuring the RIM-RS transmission occasions and RIM-RS sequences based on allocating a network node (e.g., gNB) set ID and a reference signal transmission framework configuration. In one or more embodiments, the disclosure advantageously utilizes that all possible NR TDD configurations have an integer number of periods over 20 ms, and therefore a radio frame pair, containing two 10 ms radio frames, and is therefore used as a reference point for mapping the time occasion of the reference signal transmission.

Using the teachings of the disclosure, the network can flexibly dimension the RS transmissions according to its need, trading off network node (e.g., gNB) detection complexity, detection probability and delay of RS transmission.

Regardless of the TDD UL/DL configuration used, the transmission occasions expressed in allowed system frame number(s) (SFN) can be used to map to some part of the network node (e.g., gNB) set ID.

Before describing in detail exemplary embodiments, it is noted that the embodiments reside primarily in combinations of apparatus components and processing steps related to for remote interference identification and interference mitigation based on the identification. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible for achieving the electrical and data communication.

In some embodiments described herein, the term "coupled," "connected," and the like, may be used herein to indicate a connection, although not necessarily directly, and may include wired and/or wireless connections.

The term time resource used herein may correspond to any type of physical resource or radio resource expressed in terms of length of time. Examples of time resources are: symbol, time slot, subframe, radio frame, TTI, interleaving time, etc.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipment (LEE), laptop mounted equipment (LME), Universal Serial Bus (USB) dongles, Customer Premises Equipment (CPE), an Internet of Things (IoT) device, or a Narrowband IoT (NB-IOT) device, etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, IAB node, radio access point, Remote Radio Unit (RRU) Remote Radio Head (RRH).

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for remote interference identification and interference mitigation based on the identification.

Figure 7:
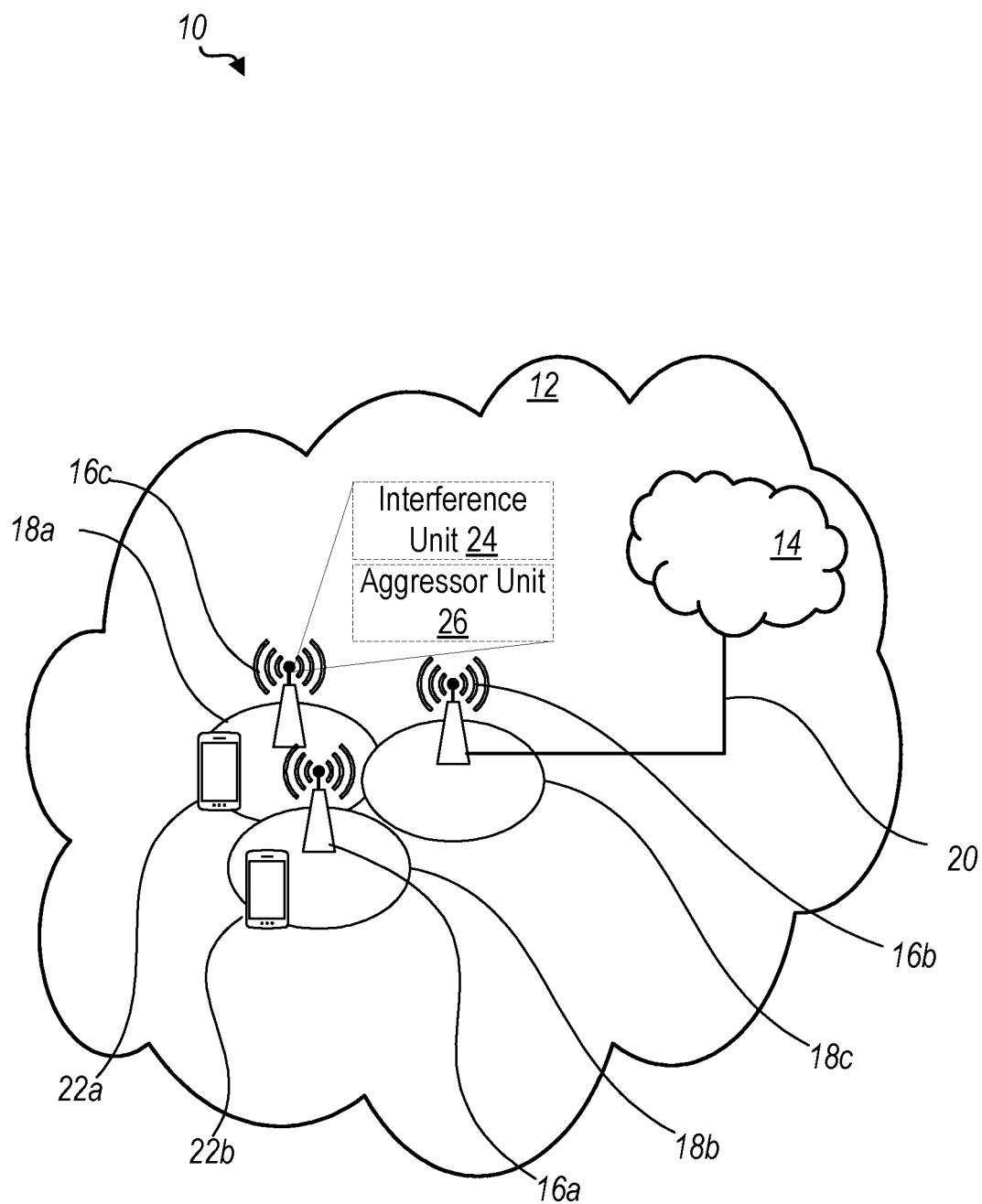
FIG. 7 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer, which may be embodied in the hardware and/or software of a standalone server, a cloud-implemented server, a distributed server or as processing resources in a server farm.

A network node 16 is configured to include an interference unit 24 configured to transmit at least one reference signal (RS) for remote interference identification in accordance with the principles of the disclosure. A network node 16 is configured to include an aggressor unit 26 which is configured to perform at least one action such as an interference mitigation action based on a network node set identifier. For example, if network node 16 is a victim network node 16a then victim network node 16a may be configured to perform one or more functions related to interference unit 24 as described herein. In another example, if network node 16 is an aggressor network node 16b then aggressor network node 16b may be configured to perform one or more functions related to aggressor unit 26 as described herein.

Example implementations, in accordance with an embodiment of a network node 16 discussed in the preceding paragraphs will now be described with reference to FIG. 8. In a communication system 10, a network node 16 is provided and includes hardware 28 enabling it to communicate with the WD 22 and other network nodes 16. The hardware 28 may include a communication interface 30 for setting up and maintaining a wired or wireless connection with an interface of another communication device of the communication system 10 such as to communicate over a backhaul network with another network node 16, as well as a radio interface 32 for setting up and maintaining at least a wireless connection with a WD 22 located in a coverage area 18 served by the network node 16. The radio interface 32 may be formed as or may include, for example, one or more RF transmitters, one or more RF receivers, and/or one or more RF transceivers. The communication interface 30 may be configured to facilitate a connection 36 such as a backhaul connection with/to one or more network nodes 16, among other entities in communication system 10.

In the embodiment shown, the hardware 28 of the network node 16 further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 42, or stored in external memory (e.g., database, storage array, network storage device, etc.) accessible by the network node 16 via an external connection. The software 44 may be executable by the processing circuitry 38. The processing circuitry 68 may be configured to control any of the methods and/or processes described herein and/or to cause such methods, and/or processes to be performed, e.g., by network node 16. Processor 40 corresponds to one or more processors 40 for performing network node 16 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to network node 16. For example, processing circuitry 38 of the network node 16 may include interference unit 24 configured to transmit at least one reference signal (RS) for remote interference identification in accordance with the principles of the disclosure. The processing circuitry 38 may also include aggressor unit 26 configured to perform at least one action such as an interference mitigation action based on a network node set identifier. In one or more embodiments, a victim network node 16 may be configured to use interference unit 24 for identifying itself to an aggressor network node 16, where the aggressor unit 26 may be omitted from the victim network node 16. In one or more embodiments, an aggressor network node 16 may be configured to use aggressor unit 26 to determine the network node set identifier associated with a victim network node 16 and perform at least one action based on the network node set identifier, where the interference unit 24 may be omitted from the aggressor network node 16.

The communication system 10 further includes one or more WDs 22 already referred to. The WDs 22 may include hardware and software to allow the WDs 22 to perform their intended communication functions. Such hardware and software might include, but is not limited to processing circuitry that includes a memory and a processor, a radio interface and a communication interface. In particular, in addition to or instead of a processor, such as a central processing unit, and memory, the WD 22 processing circuitry may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The WD processor may be configured to access (e.g., write to and/or read from) the WD memory, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). In some embodiments, the inner workings of the network node 16 may be as shown in FIG. 8 and independently, the surrounding network topology may be that of FIG. 7.

Figure 8:
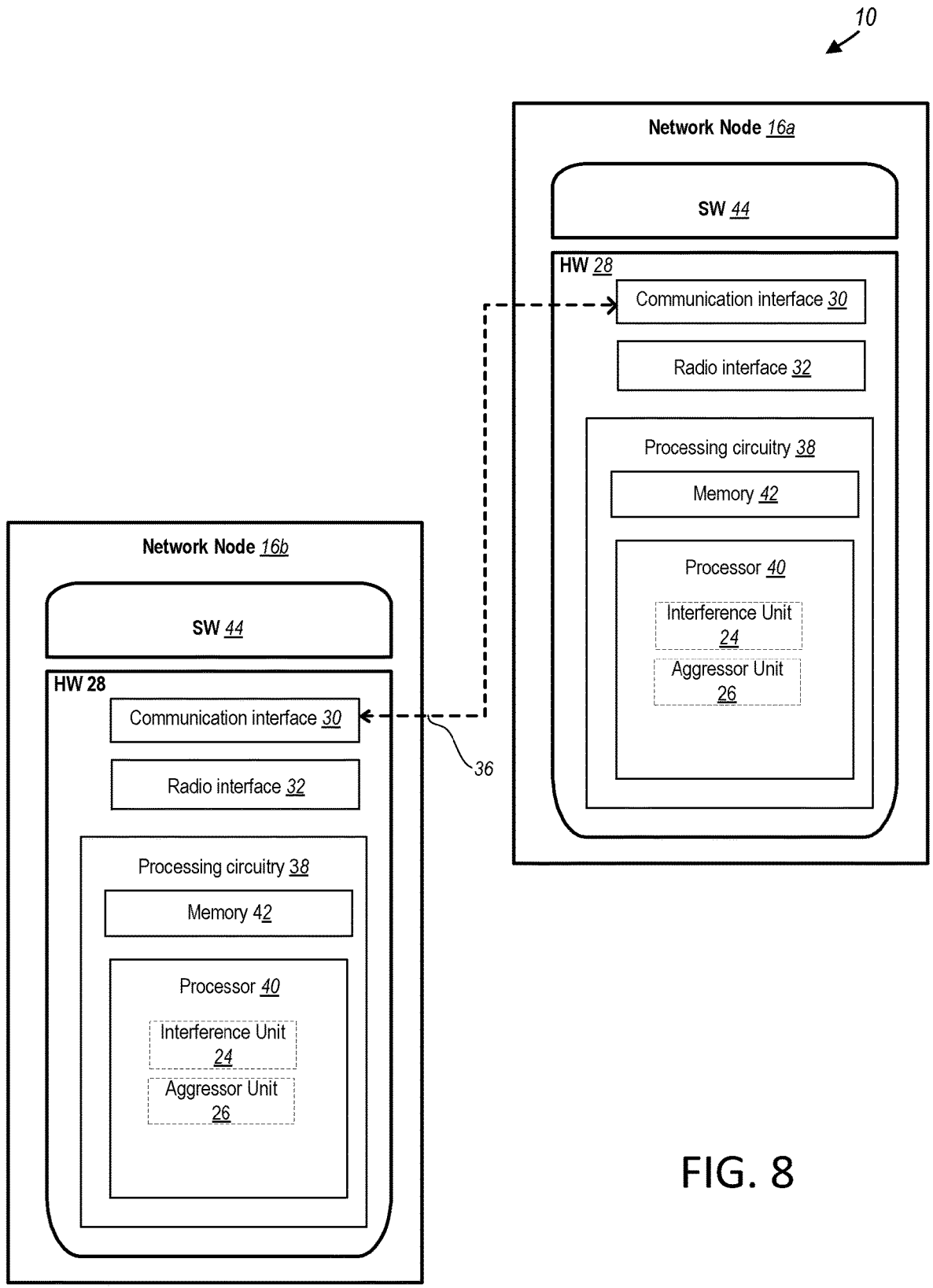
FIG. 8 is a block diagram of network nodes according to some embodiments of the present disclosure.

Although FIGS. 7 and 8 show various "units" such as interference unit 24, and aggressor unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 9:
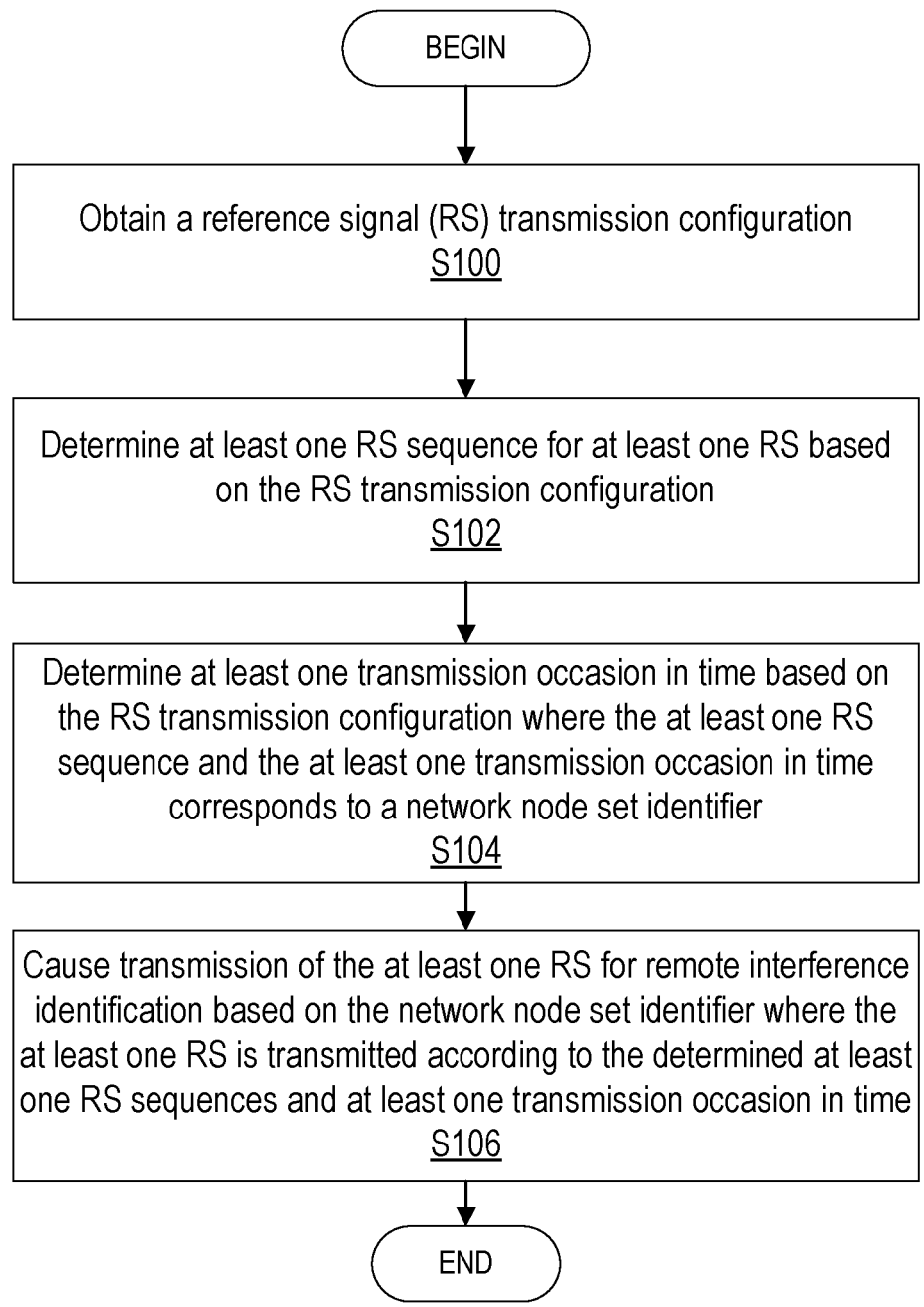
FIG. 9 is a flowchart of an exemplary process in a network node for remote interference identification according to some embodiments of the present disclosure.

FIG. 9 is a flowchart of an exemplary interference process associated with interference unit 24 in a network node 16a for transmitting at least one reference signal (RS) for remote interference identification. For example, the interference process may be performed by a victim network node 16a. Processing circuitry 38 is configured to obtain (Block S100) an RS transmission configuration. Processing circuitry 38 is configured to determine (Block S102) at least one RS sequence for at least one RS based on the RS transmission configuration. Processing circuitry 38 is configured to determine (Block S104) at least one transmission occasion in time based on the RS transmission configuration where the at least one RS sequence and the at least one transmission occasion in time corresponds to a network node set identifier. Processing circuitry 38 is configured to cause (Block S106) transmission of the at least one RS for remote interference identification based on the network node set identifier where the at least one RS is transmitted according to the determined at least one RS sequence and at least one transmission occasion in time.

In one or more embodiments, the determining of the at least one transmission occasion in time includes at least one of: determining a radio frame pair where the at least one RS is transmitted, and determining a different time occasion within the determined radio frame pair for each of the at least one RS. In one or more embodiments, the obtaining of the RS transmission configuration includes at least one of obtaining the network node set identifier, and obtaining a RS transmission framework configuration.

Figure 10:
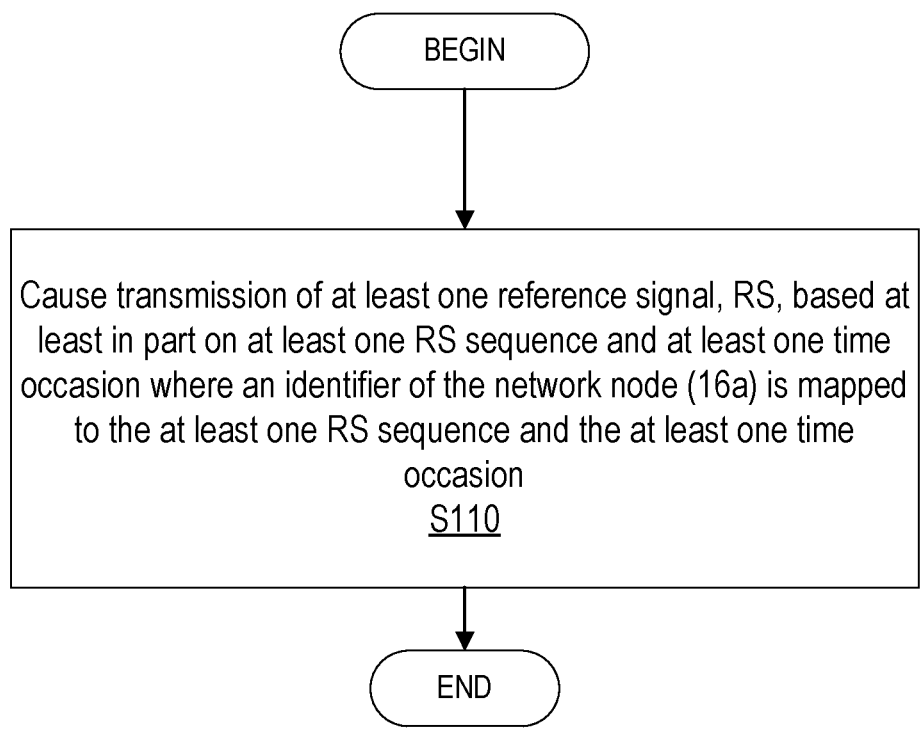
FIG. 10 is a flowchart of another exemplary process in a network node for remote interference identification according to some embodiments of the present disclosure.

FIG. 10 is a flowchart of an exemplary interference process implemented by a network node 16a according to one or more embodiments of the disclosure. For example, the process of FIG. 10 may be performed by a victim network node 16a. One or more Blocks and/or functions performed by network node 16a may be performed by one or more elements of network node 16a such as by interference unit 24 in processing circuitry 38, processor 40, radio interface 32, etc. In one or more embodiments, network node 16a such as via one or more of processing circuitry 38, processor 40, communication interface 30 and radio interface 32 is configured to cause (Block S108) transmission of at least one RS based at least in part on at least one RS sequence and at least one time occasion where an identifier of the network node 16a is mapped to the at least one RS sequence and the at least one time occasion. In other words, there is mapping between an identifier of the network node 16a and at least one RS sequence and/or at least one time occasion (i.e., time location) such that the identifier of the network node 16a is identifiable or represented by at least one RS sequence and/or at least one time occasion, both of which may be associated with the RS that is transmitted by the network node 16a. In one or more embodiments, the mapping is performed by network node 16a or received by network node 16a or indicated to network node 16a.

According to one or more embodiments of the disclosure, the network node 16a is a victim network node 16a that receives interference from downlink transmissions of another network node 16b. According to one or more embodiments of the disclosure, the identifier is identifiable from the at least one RS sequence and the at least one time occasion. According to one or more embodiments of the disclosure, the processing circuitry 38 is further configured to detect remote interference from another network node 16b where the transmission of the at least one reference signal is made in response to the detection of the remote interference.

According to one or more embodiments of the disclosure, the processing circuitry 38 is further configured to, after the transmission of the at least one RS: determine whether remote interference is still being detected; if it is determined that remote interference is still detected, cause at least one additional transmission of the at least one RS; and if it is determined that remote interference is not being detected, cease transmission of the at least one RS. According to one or more embodiments of the disclosure, the at least one time occasion corresponds to at least one of: a radio frame pair where the at least one RS is transmitted, and a different time occasion within the radio frame pair for at least one of the at least one RS. According to one or more embodiments of the disclosure, the time occasion corresponds to at least one of: at least one slot where there is a switch between downlink transmission and uplink transmission, and a fixed time location within a slot.

According to one or more embodiments of the disclosure, the at least one RS sequence includes a plurality of RS sequences, and the at least one time occasion includes a plurality of time occasions. According to one or more embodiments of the disclosure, the identifier of the network node 16a is identified by a plurality of bits. At least a first one of the plurality of bits corresponds to a first RS sequence of the plurality of RS sequences and a first time occasion of the plurality of time occasions. At least a second one of the plurality of bits corresponds to a second RS sequence of the plurality of RS sequences and a second time occasion of the plurality of time occasions. According to one or more embodiments of the disclosure, the at least one RS sequence is a same RS sequence and the at least one time occasion includes a plurality of time occasions. The same RS sequence may then be used in the RS transmission during the plurality of time occasions.

According to one or more embodiments, the identifier of the network node 16a is not explicitly included in the transmission of the RS such that the identifier of the network node 16a may have to be derived from the mapping described herein. For example, identifier "ID" of network node 16a is not included in the transmission of the RS such that the ID may be derived/determined based on the at least one RS sequence and/or at least one time occasion.

Figure 11:
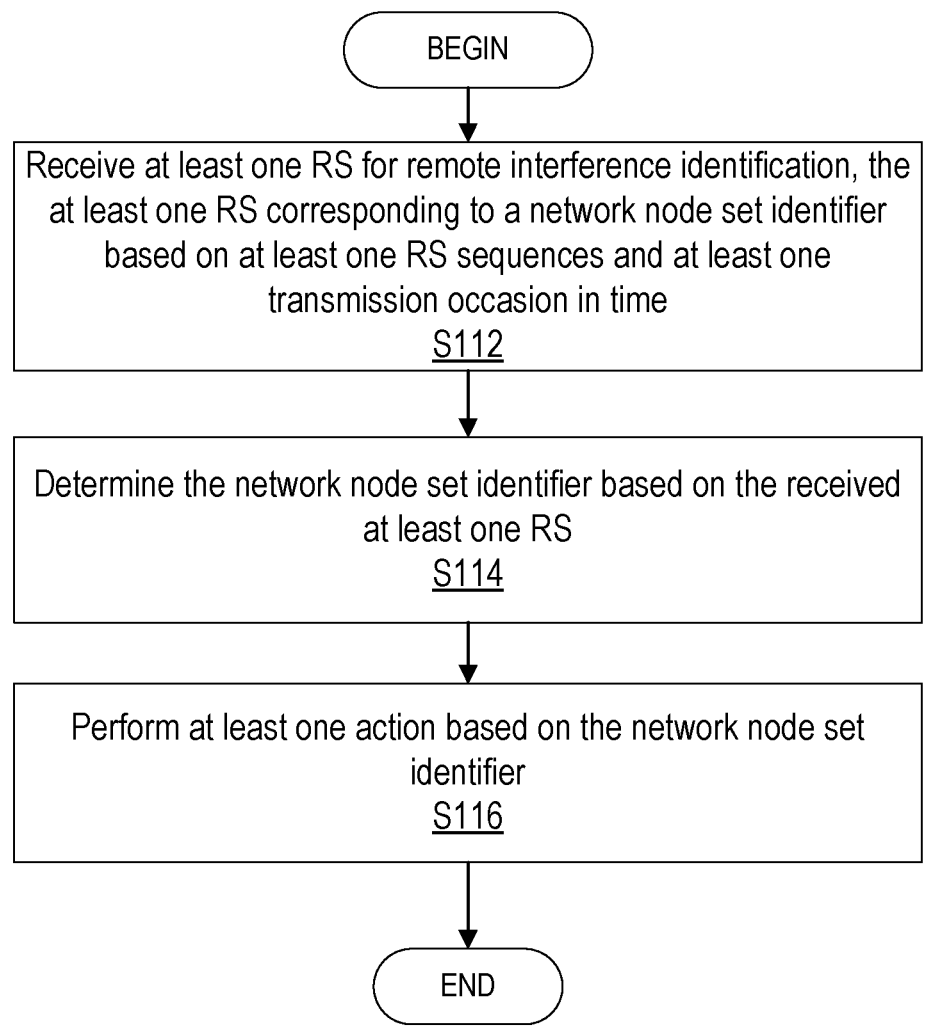
FIG. 11 is a flowchart of another exemplary process in a network node for remote interference identification and mitigation according to some embodiments of the present disclosure.

FIG. 11 is a flowchart of an exemplary aggressor process associated with aggressor unit 26 in a network node 16b for receiving at least one reference signal (RS) for remote interference identification according to some embodiments of the present disclosure. For example, the aggressor process may be performed by an aggressor network node 16b. Processing circuitry 38 is configured to receive (Block S112) at least one RS for remote interference identification where the at least one RS corresponds to a network node set identifier based on at least one RS sequence and at least one transmission occasion in time. Processing circuitry 38 is configured to determine (Block S114) the network node set identifier based on the received at least one RS. For example, in one or more embodiments, the determination of the identifier of the network node 16a is performed based at least in part on the mapping described herein. Processing circuitry 38 is configured to perform (Block S116) at least one action based on the network node set identifier.

In one or more embodiments, the at least one transmission occasion in time is based on at least one of: a radio frame pair where the at least one RS is transmitted, and a different time occasion within the determined radio frame pair for at least one, or each, of the at least one RS. In one or more embodiments, the RS transmission configuration is based on at least one of: the network node set identifier, and a RS transmission framework configuration. In one or more embodiments, the at least one action includes establishing backhaul communications with another network node 16.

Figure 12:
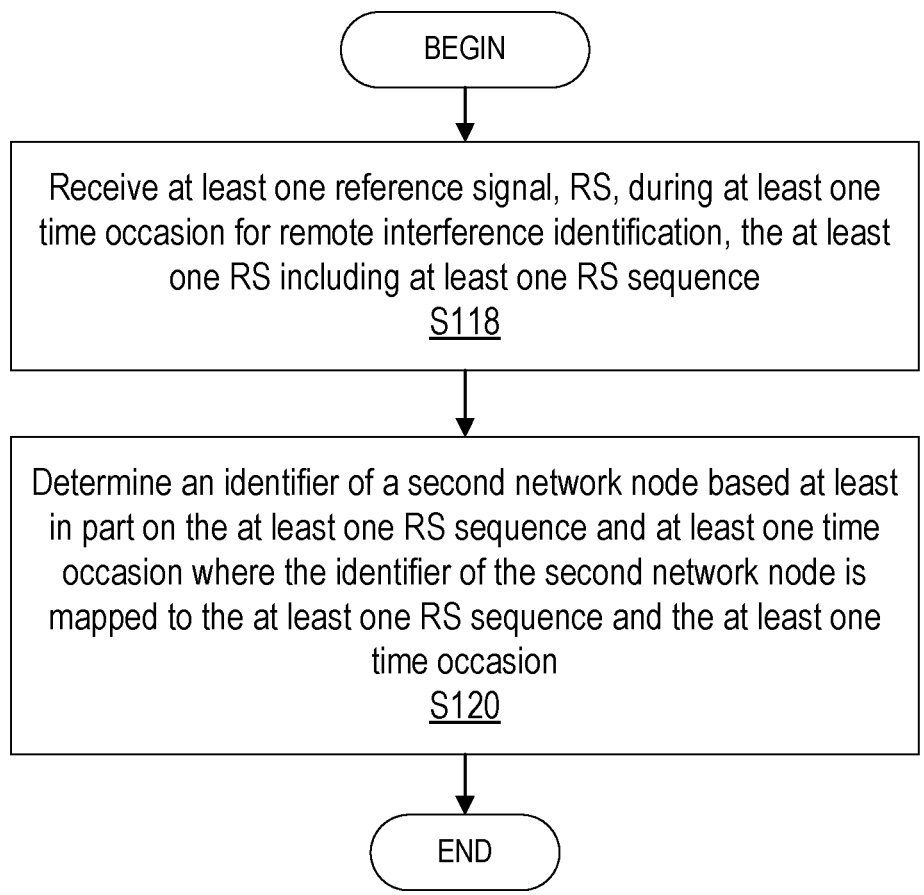
FIG. 12 is a flowchart of another exemplary process in a network node for remote interference identification and mitigation according to some embodiments of the present disclosure.

FIG. 12 is a flowchart of an exemplary aggressor process associated with aggressor unit 26 in a network node 16b for receiving at least one reference signal (RS) for remote interference identification according to some embodiments of the present disclosure. For example, the process of FIG. 12 may be performed by an aggressor network node 16b. One or more Blocks and/or functions performed by network node 16b may be performed by one or more elements of network node 16b such as by aggressor unit 26 in processing circuitry 38, processor 40, radio interface 32, etc. In one or more embodiments, network node 16b is configured to, such as via one or more of processing circuitry 38, processor 40, communication interface 30, aggressor unit 26 and radio interface 32, receive (Block S118) at least one RS during at least one time occasion for remote interference identification where the at least one RS includes at least one RS sequence, as described herein. In one or more embodiments, network node 16b is configured to, such as via one or more of processing circuitry 38, processor 40, communication interface 30, aggressor unit 26 and radio interface 32, determine (Block S120) an identifier of a second network node 16a (e.g., victim network node 16a) based at least in part on the at least one RS sequence and the at least one time occasion where the identifier of the second network node 16a is mapped to the at least one RS sequence and the at least one time occasion, as described herein. For example, in one or more embodiments, the determination of the identifier of the second network node 16a is performed based at least in part on the mapping described herein.

According to another aspect of the disclosure, a first network node 16b is provided. The first network node 16b includes processing circuitry 38 configured to receive at least one reference signal, RS, during at least one time occasion for remote interference identification where the at least one RS includes at least one RS sequence, and determine an identifier of a second network node 16a based at least in part on the at least one RS sequence and the at least one time occasion where the identifier of the second network node 16a is mapped to the at least one RS sequence and the at least one time occasion.

According to one or more embodiments of the disclosure, the processing circuitry 38 is further configured to perform at least one remote interference mitigation action based at least in part on the determined identifier of the second network node 16a. According to one or more embodiments of the disclosure, the processing circuitry 38 is further configured to, after the at least one remote interference mitigation action is performed: determine whether the at least one RS signal is detected; and if it is determined that the at least one RS signal is not detected, modify the remote interference mitigation action. According to one or more embodiments of the disclosure, the first network node 16b is an aggressor network node 16b that causes interference at the second network node 16a.

According to one or more embodiments of the disclosure, the identifier is identifiable or derivable from the at least one RS sequence and the at least one time occasion. According to one or more embodiments of the disclosure, the at least one time occasion corresponds to at least one of: a radio frame pair where the at least one RS is transmitted, and a different time occasion within the radio frame pair for at least one of the at least one RS. According to one or more embodiments of the disclosure, the time occasion corresponds to at least one of: at least one slot where there is a switch between downlink transmission and uplink transmission, and a fixed time location within a slot.

According to one or more embodiments of the disclosure, the at least one RS sequence includes a plurality of RS sequences and the at least one time occasion includes a plurality of time occasions. According to one or more embodiments of the disclosure, the identifier of the second network node 16a is identified by a plurality of bits. At least a first one of the plurality of bits corresponds to a first RS sequence of the plurality of RS sequences and a first time occasion of the plurality of time occasions. At least a second one of the plurality of bits corresponds to a second RS sequence of the plurality of RS sequences and a second time occasion of the plurality of time occasions. According to one or more embodiments of the disclosure, the at least one RS sequence is a same RS sequence and the at least one time occasion includes a plurality of time occasions. The same RS sequence may then be received in the RS transmission during the plurality of time occasions.

Having generally described arrangements for remote interference identification at the victim network node 16 and aggressor network node 16, details for these arrangements, functions and processes are provided as follows, and which may be implemented by one or more network nodes 16, e.g., 16a, 16b, etc.

Embodiments provide RS configuration and transmission for remote interference identification. In order to convey information over a communications channel without requiring fine time-frequency synchronization or coherent channel estimation, one approach is to partition the available transmission resources into a set of possible (pseudo-)orthogonal transmission locations using time, frequency and/or code-division multiplexing parameters.

In order to convey a certain message, the transmitter transmits a signal in one of the transmission locations and the receiver attempts to detect a signal in all possible transmission locations. Based on in which transmission location the receiver detects a transmitted signal, a certain message is conveyed. The amount of information that can be transmitted in this way is thus $\log_2 N$ bits, where N is the number of time/frequency/code transmission locations. The instant disclosure provides such a scheme, but modified in order to flexibly be used to encode a network node 16a (e.g., gNB) set ID into the RIM-RS transmission itself, i.e., a network node set ID may be encoded into the RIM-RS transmission. For example, in one or more embodiments, the identifier of the network node or information associated with the identifier can be conveyed in the transmission of the RS where the transmission location is time/frequency/code location, i.e., radio resources. In one or more embodiments, there is a mapping between the identifier of the network node and the resources upon which the RS is transmitted. In one or more embodiments, the identifier of the network node is mapped to an RS sequence and/or to resources upon which the RS is transmitted.

According to one or more embodiments, one or more methods for RS transmission are provided. A transmitting network node 16 such as a victim network node 16a may obtain a reference signal configuration which is comprised of a network node set ID and a reference signal transmission framework configuration. Based on the reference signal transmission framework configuration, the network node 16a has the information to map the network node set ID to RS sequence(s) and RS transmission occasions whereon the RSs for RI mitigation (according to for instance the previously described RIM frameworks) may be transmitted. Conversely, in methods for RS detection, a receiving network node 16b, e.g., gNB, may obtain a reference signal transmission framework configuration which based on the sequences and time occasions of the detected RS(s) may be used to infer the network node set ID of the transmitter(s).

This disclosure provides a flexible manner for the network to allocate the RS transmission occasions and sequences for the network nodes 16. For instance, depending on its topology and applied RI mitigation scheme, certain network implementations may group a larger number of network nodes 16 into a set and use the same RIM-RS configuration for all the network nodes 16 in the set, while other network implementations may allocate separate RIM-RS configurations to each individual network node 16. This desired effect is achieved by embodiments described herein, where obtaining the network node set ID and the reference signal transmission configuration includes the network node 16a receiving such a configuration by the network, as the RS transmission occasions and sequences are solely and unambiguously determined by the network node set ID and the reference signal transmission configuration. Thus, the network, through one or more network elements, can flexibly allocate either the same network node set ID to a plurality of network nodes 16, or, the network may allocate different network node set IDs to each individual network node 16.

In one or more embodiments, a RIM-RS occasion may be defined in each "special slot", i.e., where a DL/UL switch occurs. Alternatively, in one or more embodiments, only a subset of the DL/UL switches define a RIM-RS occasion, such as every 2nd DL/UL switch. This implies that there is one possible time occasion where RIM-RS can be transmitted within each P ms TDD periodicity, in the case of non-concatenated TDD configuration. In case of two concatenated TDD configurations (P1+P2 ms), there can be either one or two DL/UL switching points, depending on if one of the TDD configurations contains only DL (or only UL) symbols.

In order to estimate the propagation delay between the victim network node 16a and aggressor network node 16b, the victim network node 16a may transmit the RS at a fixed location within the slot. This fixed location may be in some OFDM symbol(s) and may be pre-defined or configured by the network.

For each RIM-RS transmission occasion, a single RS (which may span multiple OFDM symbols, depending on the outcome of the RIM-RS design) may thus be transmitted by the network node 16a, and information can be encoded in which RS sequence is transmitted from the RS sequence set. In one or more embodiments, one out of $N_{seq}$ possible RIM-RS sequences is transmitted, which can convey $\log_2 N_{seq}$ bits of information. The $N_{seq}$ different sequences may for instance be Gold sequences with different sequence initialization seeds, Zadoff-Chu sequences with different group and sequence numbers, or generally, selected from a set of arbitrary pre-defined sequences.

Depending on the requirement on the ID space of the network node set ID and the requirement on the time between two transmission occasions for a certain network node set ID (which determines how quickly the network can adapt to a remote interference event), it may be necessary to convey more information bits by having the network node 16a transmit multiple RSs in subsequent RS transmissions occasions, each RS transmitted on a transmission occasion carrying a certain part of the information bits of the network node set ID. The RS sequence transmitted on each of these transmission occasions is selected based on the information bits mapped to this transmission occasions, i.e., different RS sequences can be selected for the RS transmissions on these subsequent RS transmission occasions.

In one embodiment, different transmission occasions carry different parts of the information bits of the network node set ID. In one or more embodiments, different transmission occasions can also carry the same part of the information bits of the network node set ID, i.e., the network node set ID information is to some extent, depending on configuration, repeated over the transmission occasions.

In one or more embodiments, a number $N_{RS}^{(group)}$ of consecutive RIM-RS transmission occasions form a RIM-RS group. The network node 16b would then, upon detection of RI, transmit $N_{RS}^{(group)}$ subsequent RIM-RS in adjacent RIM-RS transmission occasions, each using a separate RS sequence selection, that is, the RS sequence selected for a transmission occasion depends on the value of the corresponding part of information bits to be carried on this RS transmission (if exemplifying the case of using different parts of the information bits of the network node set ID by each transmission occasion). To decode the network node set ID, a receiving network node 16b would need to successfully detect each of the $N_{RS}^{(group)}$ transmitted RSs and thus $N_{RS}^{(group)} \cdot \log_2 N_{seq}$ bits of information can be conveyed by a RIM-RS group.

In an alternative embodiment, the $N_{RS}^{(group)}$ RIM-RS occasions within the RIM-RS group are further sub-grouped into $$\frac{N_{RS}^{(group)}}{N_{rep}}$$

repetition sets, where each repetition set comprise $N_{rep}$ RIM-RSs which are transmitted using the same RS sequence. That is, a certain sequence is repeated $N_{rep}$ times so that $$\frac{N_{RS}^{(group)}}{N_{rep}}$$

different RS sequences can be conveyed by the transmission of a RIM-RS group. In other words, the same RS sequence is repeated for each of the plurality of time occasions e.g. in a repetition set. This can achieve higher detection reliability since the receiver may utilize that a certain RS sequence is repeated in several subsequent time occasions.

In one or more embodiments, some parts of the network node set ID is thus encoded in the selection of RS sequences for the transmitted RSs in the RIM-RS group, while the remaining parts of the network node set ID is encoded in the time location of the RIM-RS group. Thus, a mapping is needed between part of the gNB set ID and the transmission occasion(s), however, how this can be done is not obvious since NR TDD configurations are very flexible. For example, in NR, the supported basic TDD periodicities using 30 kHz SCS are {0.5, 1, 2, 2.5, 3, 4, 5, 10} ms. A subset of these is allowed to be selected for non-concatenated and concatenated TDD periodicities as is further discussed below.

The allowed non-concatenated TDD periodicities using 30 kHz SCS are P∈{0.5, 1, 2, 2.5, 4, 5, 10} ms while the allowed concatenated TDD periodicities are $P_1+P_2 \in \{1, 2, 2.5, 4, 5, 10, 20\}$ ms. Not all combinations of P1 and P2 are allowed, since $P_1+P_2$ must divide 20 ms evenly in order to comply with WDs assumption on the presence of SSB during initial access. Moreover, there can be multiple TDD configurations that give the same TDD configuration periodicity. For instance, a TDD configuration periodicity of 5 ms can be configured by a non-concatenated TDD pattern with 5 ms periodicity, or by two concatenated TDD patterns with $P_1=2$ ms and $P_2=3$ ms, or $P_1=2.5$ ms and $P_2=2.5$ ms, or with $P_1=1$ ms and $P_2=4$ ms. Thus, since concatenated TDD configurations can be used, it can be quite complicated to determine the number of available DL/UL switching points over a certain time period. However, regardless of TDD configuration, all periodicities "resets" over 20 ms. Hence a 20 ms interval, i.e., two 10 ms radio frames, may be used as a reference point.

Taking this into account, in an embodiment, a 20 ms radio frame pair (RFP) having two subsequent 10 ms radio frames is used as a reference point. Within a radio frame pair, the network may configure that $N_{group}$ RIM-RS groups can be allocated (where each RIM-RS group corresponds to a different network node set ID). Depending on the actual TDD configuration used as well as the number of RIM-RSs in the RIM-RS group, there will be a maximum possible value of $N_{group}$. For instance, consider a non-concatenated TDD configuration with 5 ms TDD periodicity and assume that $N_{RS}^{(group)}=2$ $N_{group}$ can be either 1 or 2, while for a non-concatenated TDD configuration with 1 ms TDD periodicity and $N_{RS}^{(group)}=1$ the value of $N_{group}$ can range from 1 to 20.

In other embodiments, the configuration of the interval over which the RS occasions occur is determined by configuration parameters and is configured to occur in a multiple of TDD periodicities. In another embodiment, the configuration is configured to occur over a certain time duration.

Figure 13:
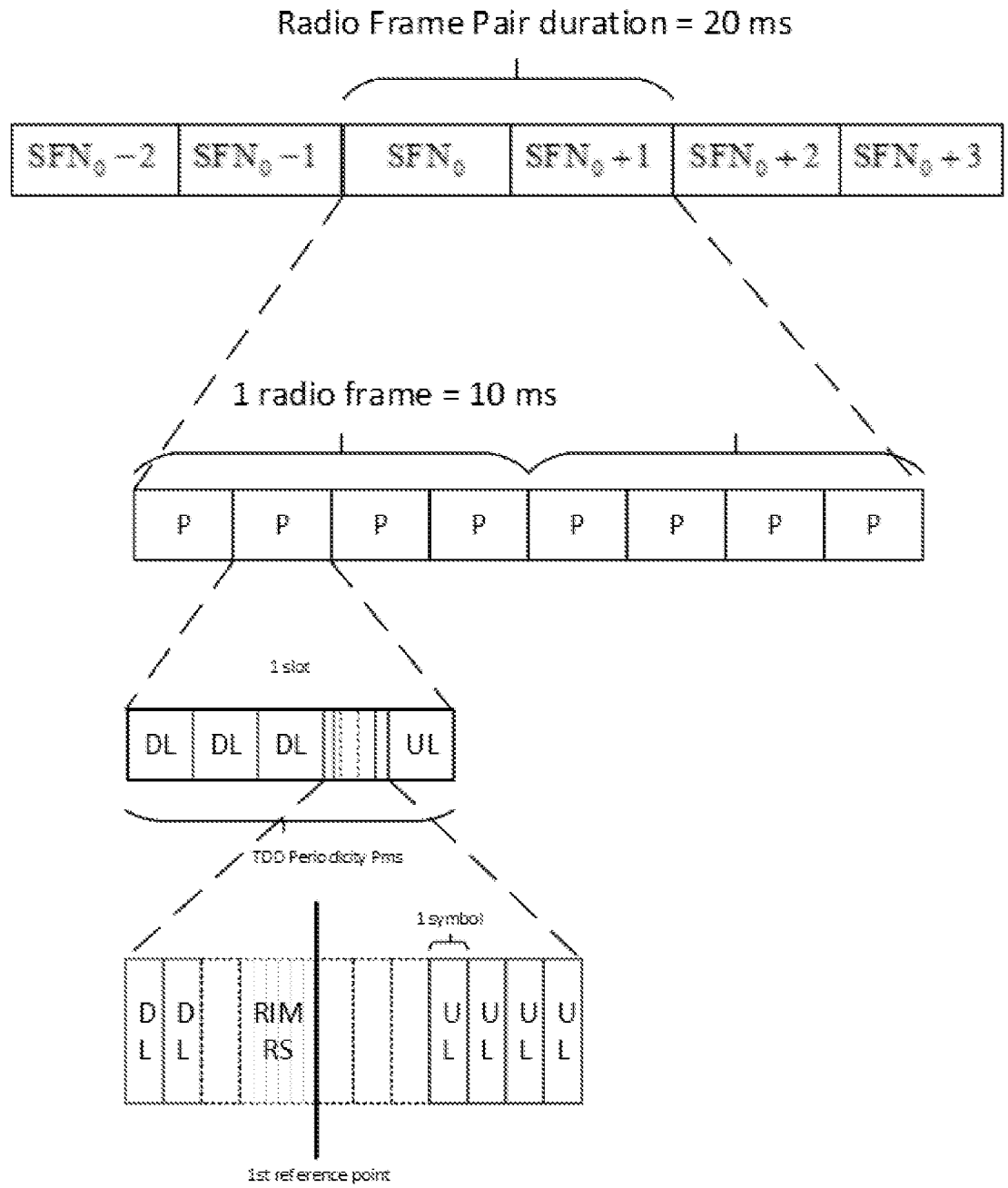
FIG. 13 is a diagram of RIM RS transmission possibility in each UL/DL switching point.
Figure 14:
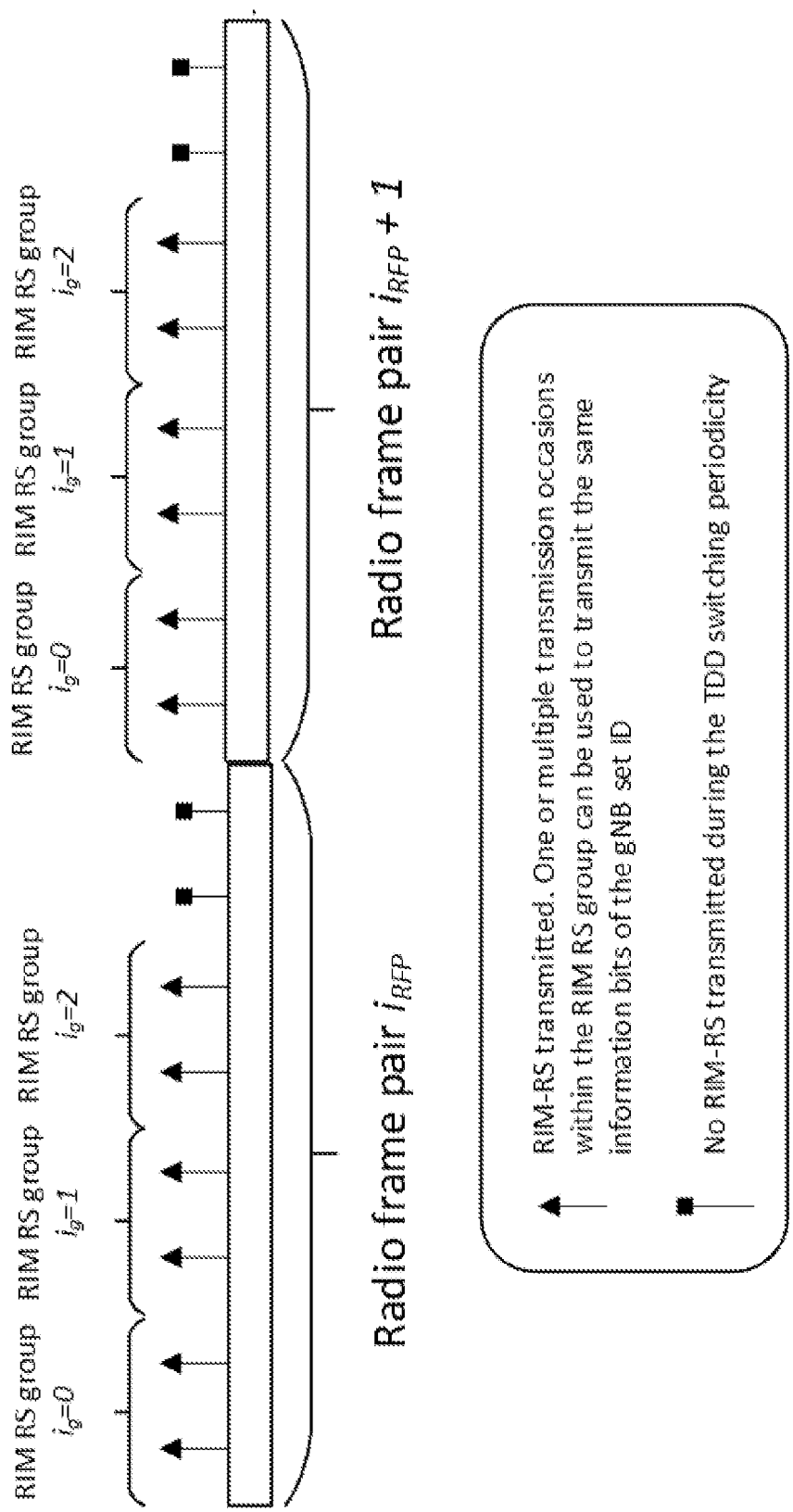
FIG. 14 is a diagram of a division of RIM RS transmission occasions into RIM RS groups within a radio frame pair.

Example embodiments of the disclosed RIM RS transmission framework are illustrated in FIG. 13 and FIG. 14.

The network node set ID space may then be determined by the duty cycle of RIM-RS transmission, i.e., how many RFPs would transpire between two RIM-RS group transmission occasions for the same network node set ID. Thus, a RIM-RS duty cycle may be defined as $T_{duty}=N_{RFP} \cdot 20 \cdot 20 \cdot 10^{-3}$ s, i.e., consisting of $N_{RFP}$ radio frame pairs.

The parameters ($N_{seq}$, $N_{RS}^{(group)}$, $N_{group}$, $N_{RFP}$) may then define the RIM-RS transmission framework and there would be $N_{group} N_{RFP}$ transmission occasions for different RIM-RS groups, while there would be $(N_{seq})^{N_{RS}^{(group)}}$ different possible RS sequence combinations in a RIM-RS group. This results in $(N_{seq})^{N_{RS}^{(group)}} N_{group} N_{RFP}$ possible network node set IDs, i.e. $i_{set} \in \{0, \ldots, (N_{seq})^{N_{RS}^{(group)}} N_{RFP}-1\}$.

The parameters ($N_{seq}$, $N_{RS}^{(group)}$, $N_{group}$ $N_{RFP}$) may in some embodiments constitute the reference signal transmission framework configuration and may be configured for the network node 16 by the network for RIM-RS transmission/reception.

An example is given below how sequences and transmission occasions can be encoded into the network node set ID by modifying existing systems as described herein.

Example Encoding:
A radio frame pair index $i_{RFP} \in \{0, \ldots, N_{RFP}-1\}$ is mapped to allocated radio frames for RIM-RS transmission as mod $$\left(\left\lfloor\frac{SFN}{2}\right\rfloor, N_{RFP}\right) = i_{RFP}.$$

That is two adjacent radio frames with subsequent system frame numbers (SFN) are allocated every $2N_{RFP}$ radio frames.

A group index $i_{group} \in \{0, \ldots, N_{group}-1\}$ defines the allocated RIM-RS group within the radio frame pair.

A set of RIM-RS sequence IDs $i_{seq}^{(0)}, \ldots, i_{seq}^{(N_{RS}^{(group)}-1)}$ defines the allocated RIM-RS sequence for each RIM-RS transmission occasion within the RIM-RS group, where $i_{seq}^{(k)} = \{0, \ldots, N_{seq}-1\}$, $k=0, \ldots, N_{RS}^{(group)}-1$ The above indexes are mapped to the network node set ID as $i_{set} = (N_{seq})^{N_{RS}^{(group)}} N_{group} \cdot i_{RFP} + (N_{seq})^{N_{RS}^{(group)}} \cdot i_{group} + \Sigma_{k=0}^{N_{RS}^{(group)}-1}(N_{seq})^k \cdot i_{seq}^{(k)}$, or by directly mapping the indices $i_{RFP}, i_{group}, i_{seq}^{(0)}, \ldots, i_{seq}^{(N_{RS}^{(group)}-1)}$ to different information bits of the network node set ID.

Given a certain maximum ID space of the network node set ID, a design parameter corresponds to how to partition the transmission locations between code, frequency and time-domains. The identifier of the network node 16a may map to a configuration defined by one or more parameters such as one or more of RS sequences and/or one or more time occasions. In other words, this is a mapping between an identifier of network node 16a and one or more of RS sequence(s) and radio resources used for transmission/reception of at least one RS as described herein.

It should be noted that each of the above parameters for determining the overall set of RS occasions and its mapping to the physical resources may be pre-defined in the specifications, or, configurable per each network node 16a. Furthermore, not all parameters might be used in the end for the specification. Assume for example $N_{group}$ is always set to one, in which case this parameter need not be described in the specification. This might apply for any of the above given parameters.

In some embodiments, more code-domain locations are allocated, which makes the possible transmission occasions for a certain network node 16a lighter or denser in time and hence it would take shorter time to configure all network nodes 16 in the network, which may reduce the delay for a RIM mitigation mechanism to be applied at the aggressor network node 16b, especially if multi-shot detection of the RIM-RS is required.

In other embodiments, more time-domain locations are allocated in order to reduce the detection complexity, as the network node 16a has to try to detect fewer sequences per transmission occasion (and in addition, the detection probability is increased).

In other embodiments, two or more RS sequences are transmitted at the same time-domain occasion, occupying non-overlapping parts of the total transmission bandwidth, which may reduce the reaction time of the RIM mitigation mechanism.

In other embodiments, where two or more RS sequences are transmitted at the same time-domain occasion, occupying non-overlapping parts of the total transmission bandwidth, the location of the transmission occasion in the frequency domain enables conveying additional bits of information, where the total number of bits conveyed is $N_{RS}^{group} \cdot \log_2 N_{seq} \log_2 N_{bwp}$. $N_{bwp}$ is the number of parts that the total transmission bandwidth is divided into, where each bandwidth part (BWP) is allocated for transmission of one RS sequence.

In other embodiments, more time-, frequency- and code-domain locations are allocated in order to convey additional identifiers or references to the victim network nodes 16, such as the ID of the core network node that the victim network nodes 16 are affiliated to. The knowledge of these additional IDs may reduce the reaction time of the RIM mitigation mechanism.

SOME EXAMPLES

Example 1. A method, performed in a network node 16a, of transmitting one or more reference signals (RSs) for remote interference identification, the method comprising:
a) obtaining a RS transmission configuration,
b) determining, based on the RS transmission configuration, for each of the one or more RSs, a RS sequence,
c) determining, based on the RS transmission configuration, for each of the one or more RSs, a transmission occasion in time, and
d) transmitting the one or more RSs using the determined RS sequences in the determined transmission occasions.

Example 2. The method of Example 1, wherein determining the transmission occasion in time comprises determining a radio frame pair wherein all of the one or more reference signals are to be transmitted.

Example 3. The method of Example 2, wherein determining the transmission occasion in time additionally comprises determining a different time occasion within the determined radio frame pair for each of the one or more RSs.

Example 4. The method of Example 1, wherein obtaining the RS transmission configuration comprises obtaining a network node (gNB) set identifier.

Example 5. The method of Example 4, wherein obtaining the RS transmission configuration additionally comprises obtaining a RS transmission framework configuration.

Example A1. A network node 16a for transmitting at least one reference signal (RS) for remote interference identification, the network node 16a configured to, and/or comprising a radio interface 32 and/or comprising processing circuitry 38 configured to:
obtain a RS transmission configuration;
determine at least one RS sequence for at least one RS based on the RS transmission configuration;
determine at least one transmission occasion in time based on the RS transmission configuration, the at least one RS sequence and the at least one transmission occasion in time corresponding to a network node set identifier;
transmit the at least one RS for remote interference identification based on the network node set identifier, the at least one RS being transmitted according to the determined at least one RS sequences and at least one transmission occasion in time.

Example A2. The network node 16a of Example A1, wherein determining the at least one transmission occasion in time includes at least one of:
determining a radio frame pair where the at least one RS is transmitted; and
determining a different time occasion within the determined radio frame pair for each of the at least one RS.

Example A3. The network node 16a of Example A1, wherein obtaining the RS transmission configuration includes at least one of:

obtaining the network node set identifier; and
obtaining a RS transmission framework configuration.

Example B1. A method implemented in a network node 16a for transmitting at least one reference signal (RS) for remote interference identification, the method comprising:
obtaining a RS transmission configuration;
determining at least one RS sequence for at least one RS based on the RS transmission configuration;
determining at least one transmission occasion in time based on the RS transmission configuration, the at least one RS sequence and the at least one transmission occasion in time corresponding to a network node set identifier;
transmitting the at least one RS for remote interference identification based on the network node set identifier, the at least one RS being transmitted according to the determined at least one RS sequences and at least one transmission occasion in time.

Example B2. The method of Example B1, wherein determining the at least one transmission occasion in time includes at least one of:
determining a radio frame pair where the at least one RS is transmitted; and
determining a different time occasion within the determined radio frame pair for each of the at least one RS.

Example B3. The method of Example B1, wherein obtaining the RS transmission configuration includes at least one of:
obtaining the network node set identifier; and
obtaining a RS transmission framework configuration.

Example C1. A network node 16b for receiving at least one reference signal (RS) for remote interference identification, the network node 16b configured to, and/or comprising a radio interface 32 and/or processing circuitry 38 configured to:
receive at least one RS for remote interference identification, the at least one RS corresponding to a network node set identifier based on at least one RS sequences and at least one transmission occasion in time;
determine the network node set identifier based on the received at least one RS; and
perform at least one action based on the network node set identifier.

Example C2. The network node 16b of Example C1, wherein the at least one transmission occasion in time is based on at least one of:
a radio frame pair where the at least one RS is transmitted; and
a different time occasion within the determined radio frame pair for each of the at least one RS.

Example C3. The network node 16b of Example C1, wherein the RS transmission configuration is based on at least one of:
the network node set identifier; and
a RS transmission framework configuration.

Example C4. The network node 16b of Example C1, wherein the at least one action includes establishing backhaul communications with another network node 16a.

Example D1. A method implemented in a network node 16b for receiving at least one reference signal (RS) for remote interference identification, the method comprising:
receiving at least one RS for remote interference identification, the at least one RS corresponding to a network node set identifier based on at least one RS sequences and at least one transmission occasion in time;
determining the network node set identifier based on the received at least one RS; and
performing at least one action based on the network node set identifier.

Example D2. The method of Example D1, wherein the at least one transmission occasion in time is based on at least one of:
a radio frame pair where the at least one RS is transmitted; and
a different time occasion within the determined radio frame pair for each of the at least one RS.

Example D3. The method of Example D1, wherein the RS transmission configuration is based on at least one of:
the network node set identifier; and
a RS transmission framework configuration.

Example D4. The method of Example D1, wherein the at least one action includes establishing backhaul communications with another network node 16a.

Standardizing the Proposed Solutions

The Appendix below provides non-limiting examples of how certain aspects of the proposed solutions could be implemented within the framework of a specific communication standard. In particular, the Appendix provides non-limiting examples of how the proposed solutions could be implemented within the framework of a 3GPP TSG RAN standard. The changes described by the Appendix are merely intended to illustrate how certain aspects of the proposed solutions could be implemented in a particular standard. However, the proposed solutions could also be implemented in other suitable manners, both in the 3GPP Specification and in other specifications or standards.

APPENDIX

Introduction

In RAN1 #94 Chairman's notes, RAN1 #94, Gothenburg, Sweden, discussion took place regarding RIM frameworks and it was agreed to capture four different frameworks in 3GPP TR 38.866. All these frameworks rely on the victim gNB performing RIM-RS transmission upon detection of RI to notify aggressor gNB(s) that they are causing RI to the victim. Two of these frameworks, Framework 2-1 and 2-2, rely on backhaul signalling from the aggressor to the victim(s) to notify the victim(s) that the transmitted RIM-RS was received. Thus, for these frameworks, the RIM-RS transmission must carry victim gNB identification information for backhaul link establishment. It is possible that several victim gNBs form a set of gNBs which share the same RIM-RS, and thus the RIM-RS transmission must convey a gNB set ID.

Figure 15:
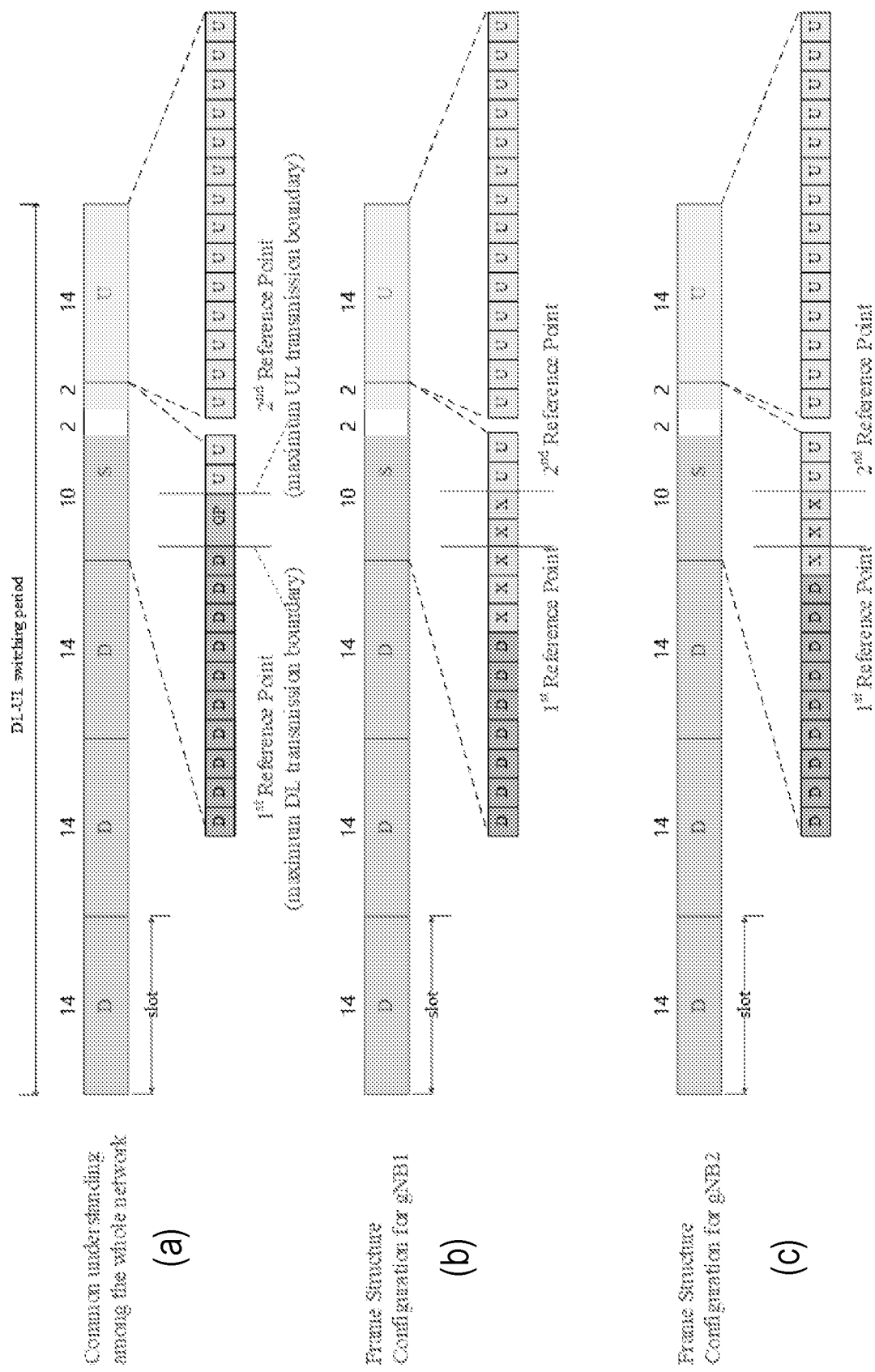
FIG. 15a-c are diagrams of downlink and uplink transmission boundaries within a DL-UL transmission periodicity.

Furthermore, it was also agreed in RAN1 #94 that a common understanding within the network of a maximum DL transmission boundary as well as maximum UL reception boundary within a DL-UL transmission periodicity can be assumed:

Agreement:

As shown in FIGS. 15(a)-(c), it is assumed in the RIM study that the whole network with synchronized macro cells has a common understanding on a DL transmission boundary (denotes as the 1st reference point) which indicates the ending boundary of the DL transmission, and an UL reception boundary (denotes as the 2nd reference point) which denotes the starting boundary of the first allowed UL reception within a DL-UL transmission periodicity.

The boundary may be considered for RS design

The 1st reference point locates before the 2nd reference point.

DISCUSSION

In order to convey information over a communication channel without requiring fine time-frequency synchronization or coherent channel estimation, the most robust approach is to partition the available transmission resources into a set of possible (pseudo-)orthogonal transmission locations using time, frequency and/or code-division multiplexing. To convey a certain message, the transmitter would transmit a signal in one of the transmission locations and the receiver would try to detect a signal in all possible transmission locations. Based on in which transmission location the receiver detects a transmitted signal, a certain message is conveyed. The amount of information that can be transmitted in this way is thus $\log_2 N$ bits, where N is the number of time/frequency/code transmission locations. Such a scheme can be used to encode a gNB set ID into the RS transmission itself in our view.

It is desirable to have a flexible method for the network to allocate the RS transmission occasion and sequence for the gNBs. That is why it was decided in RAN1 #94 that a RS transmission may carry a "gNB set ID" rather than a gNB ID or cell ID or equivalent. For instance, depending on its topology and applied RIM mitigation scheme, certain network implementations may find it desirable to group a larger number of gNBs in a set and to use the same RIM-RS configuration for all the gNBs in the set, while other network implementations may allocate separate RIM-RS configurations to each individual gNB. The grouping of gNBs by network configuration should however be transparent to each individual gNB, and the RIM-RS transmission configuration should only depend on the gNB set ID, which could be configured to the gNB by for instance the core network.

Proposal 1 The RIM-RS transmission configuration depends only on the "gNB set ID"

Given a certain maximum ID space of the gNB set ID, the next question is how to partition the transmission locations between code, frequency and time-domains. If more time-domain locations are allocated, the possible transmission occasions for a certain gNB would be sparser in time and hence it would take longer time to sound all gNBs in the network, which increases the delay before a RIM mitigation mechanism can be applied at the aggressor, especially if multi-shot detection of the RIM-RS is required. On the other hand, if more code-domain locations are allocated, the detection complexity is increased as the gNB has to try to detect more sequences per transmission occasion (and in addition, the detection probability is decreased). Thus, it is not clear that a fixed mapping of gNB set ID to RIM-RS transmission configuration can be used. Instead, it would be beneficial to introduce some configurability so that the RIM-RS transmissions can be tailored toward the need of each network implementation.

Proposal 2 The RIM-RS transmission should be configurable so it can be tailored toward different network implementations Proposed RIM-RS Transmission Framework Based on discussion in RAN1 #94, it seems it is common understanding that the RIM-RS should be transmitted in the "special slot", i.e. where a DL/UL switch occurs. To estimate the propagation delay between the victim gNB and aggressor gNB, the victim should transmit the RS at a fixed location within the slot. This fixed location should in our view be the OFDM symbol(s) immediately preceding the previously agreed $1^{st}$ reference point, i.e. the common understanding in the network of the latest OFDM symbols that can carry DL in the "special slot", i.e. where DL/UL switch occurs.

Proposal 3 The RIM-RS is to be transmitted in the OFDM symbol(s) immediately preceding the $1^{st}$ reference point (the DL transmission boundary)

This implies that there is one possible time occasion where RIM-RS can be transmitted within each P ms TDD periodicity, in the case of non-concatenated TDD configuration. In case of two concatenated TDD configurations (P1+P2 ms), there can be either one or two DL/UL switching points, depending on if one of the TDD configurations contains only DL (or only UL) symbols.

Proposal 4 Each DL/UL switching point within a P ms or P1+P2 ms TDD periodicity constitutes a possible RIM-RS transmission occasion in time For each RIM-RS transmission occasion, a single RS (which may span multiple OFDM symbols, depending on the outcome of the RIM-RS design) may thus be transmitted by the gNB, and information can be encoded in which RS sequence is transmitted. It can be assumed that one out of $N_{seq}$ possible RIM-RS sequences is transmitted, which can convey $\log_2 N_{seq}$ bits of information. The value of $N_{seq}$ should be configurable by the network.

Proposal 5 In a RIM-RS transmission occasion, one out of $N_{seq}$ RIM-RS sequences can be transmitted, where $N_{seq}$ is configurable by the network Depending on the requirement on the ID space of the gNB set ID and the requirement on the time between two transmission occasions for a certain gNB set (which would determine how quick the network can adapt to a remote interference event), it may be necessary to convey more information bits by having the gNB transmit multiple RSs in subsequent RS transmissions occasions, each RS using a different sequence. It is therefore proposed that a number $N_{RS}^{(group)}$ consecutive RIM-RS transmission occasions form a RIM-RS group. The gNB would then upon detection of RI transmit $N_{RS}^{(group)}$ subsequent RIM-RS in adjacent RIM-RS transmission occasions, each using a separate RS sequence. To decode the gNB ID, a receiving gNB would need to successfully detect each of the $N_{RS}^{(group)}$ transmitted RSs and thus $N_{RS}^{(group)} \cdot \log_2 N_{seq}$ bits of information can be conveyed.

Proposal 6 A number $N_{RS}^{(group)}$ consecutive RIM-RS transmission occasions constitute a RIM-RS group. A gNB set would transmit a RIM-RS on all occasions of the RIM-RS group, with a separate sequence for each occasion.

Some parts of the gNB set ID can thus be encoded in the selection of RS sequences for the transmitted RSs in the RIM-RS group, while the remaining parts of the gNB set ID can be encoded in the time location of the RIM-RS group. Thus, a mapping is needed between part of the gNB set ID and the transmission occasion(s), however how this can be done is not obvious since NR TDD configurations are very flexible.

The allowed non-concatenated TDD periodicities using 30 kHz SCS as an example are $P \in \{0.5,1,2,2.5,5,10\}$ ms while the allowed concatenated TDD periodicities are $P_1+P_2 \in \{1,2,2.5,45,10,20\}$ ms. Not all combinations of P1 and P2 are allowed, since $P_1+P_2$ must divide 20 ms evenly in order to comply with UEs assumption on the presence of SSB during initial access. Thus, especially due to that concatenated TDD configurations can be used, it can be quite complicated to determine the number of available DL/UL switching points over a certain time period. However, it is noted that regardless of TDD configuration, all periodicities "resets" over 20 ms. Hence a 20 ms interval, i.e. two 10 ms radio frames, can be used as a reference point.

Observation 1 All NR TDD periodicities must divide 20 ms evenly, hence 20 ms time interval can be used as reference points regardless of TDD configuration to derive possible RIM-RS transmission occasions It is therefore proposed that a 20 ms radio frame pair (RFP) consisting of two subsequent 10 ms radio frames are used as this reference point. Within a radio frame pair, the network can configure that $N_{group}$ RIM-RS groups can be allocated (where each RIM-RS group correspond to a different gNB set). Depending on the actual TDD configuration used as well as the number of RIM-RSs in the RIM-RS group, there will be a maximum possible value of $N_{group}$. For instance, if 5 ms TDD periodicity is used and $N_{RS}^{(group)}=2$ $N_{group}$ can be either 1 or 2, while for 1 ms TDD periodicity and $N_{RS}^{(group)}=1$, the value of $N_{group}$ can range from 1 to 20.

Proposal 7 Define a radio frame pair as two subsequent radio frames. Each radio frame pair contains $N_{group}$ consecutive RIM-RS groups, which is configurable by the network.

Figure 16:
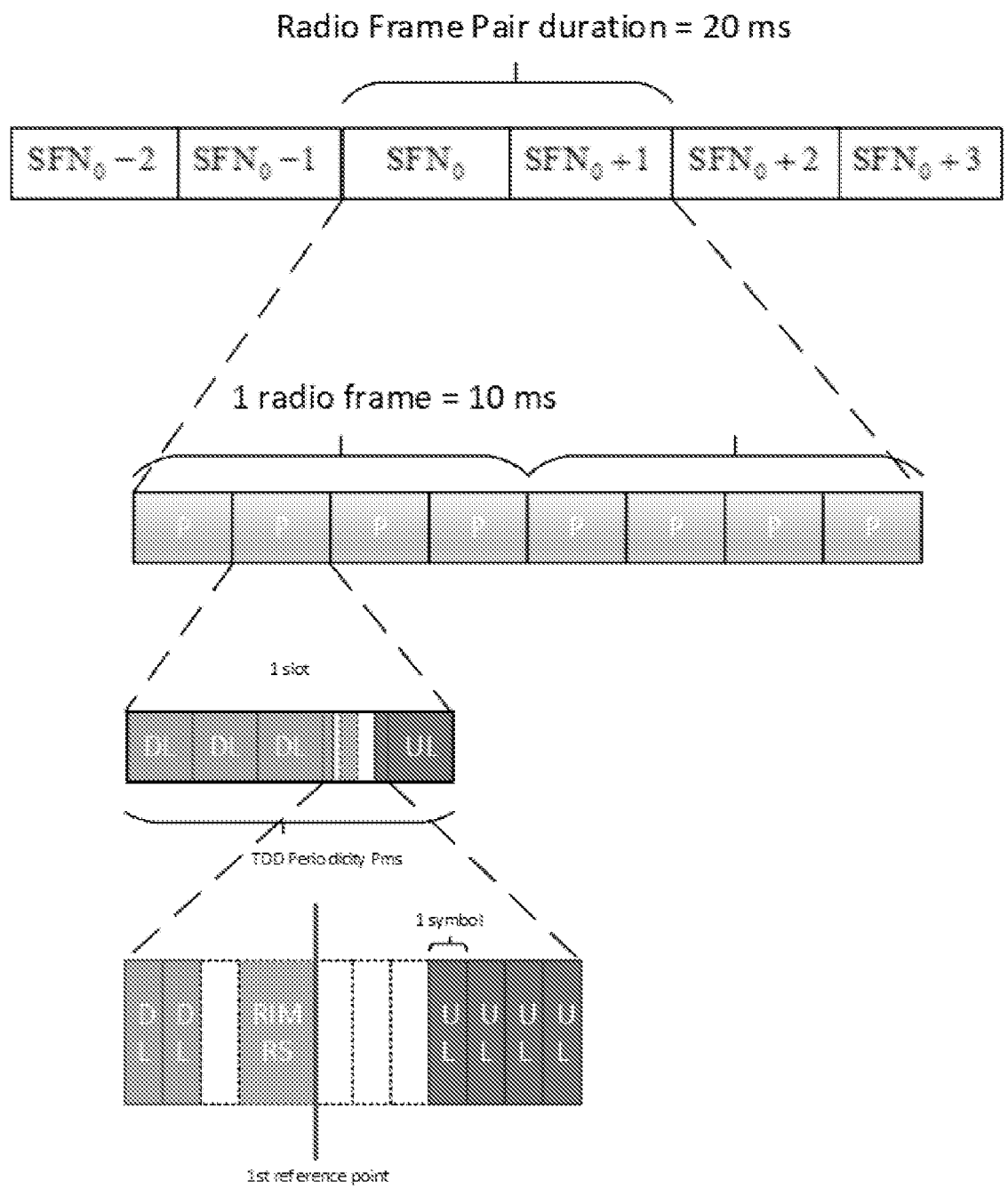
FIG. 16 is a diagram of a RIM RS transmission possibility in each UL/DL switching point.
Figure 17:
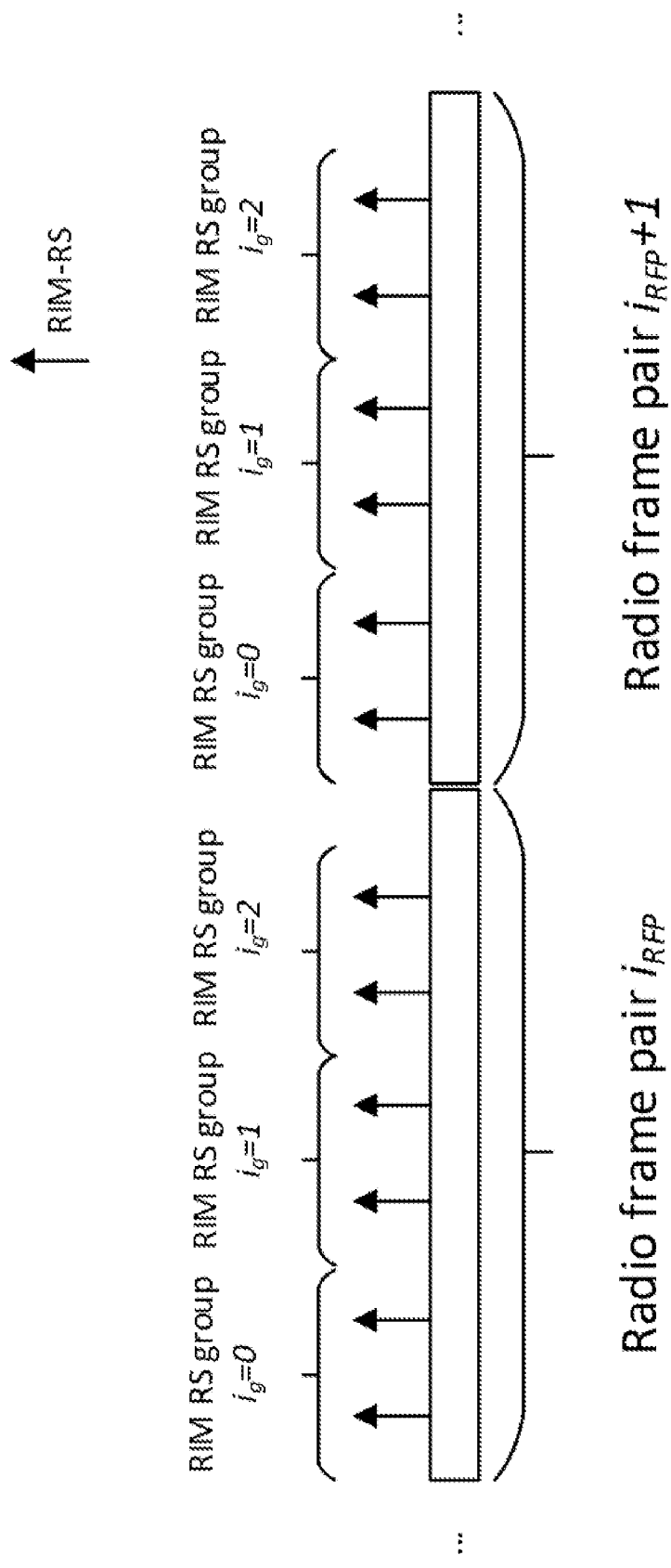
FIG. 17 is a diagram of a division of RIM RS transmission occasions into RIM RS groups within a radio frame pair.

The proposed RIM RS transmission framework is illustrated in FIG. 16 and FIG. 17.

In this case $N_{RS}^{(group)}=2$ and $N_{group}=3$.

The gNB set ID space would then be determined by the duty cycle of RIM-RS transmission, i.e. how many RFPs would transpire between two RIM-RS transmission occasions for the same gNB set.

Proposal 8 Define the RIM-RS duty cycle as $T_{duty}=N_{RFP} \cdot 20 \cdot 10^{-3}$ s, i.e. consisting of $N_{RFP}$ radio frame pairs Thus, the parameters ($N_{seq}$, $N_{RS}^{(group)}$, $N_{group}$, $N_{RFP}$) would define the RIM-RS transmission framework and there would be $N_{group}N_{RFP}$ transmission occasions for a RIM-RS group, while there would be $(N_{seq})^{N_{RS}^{(group)}}$ different possible RS sequence combinations in a RIM-RS group. This results in $(N_{seq})^{N_{RS}^{(group)}} N_{group} N_{RFP}$ possible gNB set IDs, i.e. $i_{set} \in \{0, \ldots, (N_{seq})^{N_{RS}^{(group)}} N_{group} N_{RFP}-1\}$.

Proposal 9 The parameters ($N_{seq}$, $N_{RS}^{(group)}$, $N_{group}$, $N_{RFP}$) constitute a RIM-RS framework configuration and is configured to the gNB by the network for RIM-RS transmission/reception An example is given below how sequences and transmission occasions can be encoded into the gNB set ID using this framework.

Example Encoding

A radio frame pair index $i_{RFP} \in \{0, \ldots, N_{RFP}-1\}$ is mapped to allocated radio frames for RIM-RS transmission as mod $$\left(\left\lfloor \frac{SFN}{2} \right\rfloor, N_{RFP}\right) = i_{RFP}.$$

That is two adjacent radio frames with subsequent system frame numbers (SFN) are allocated every $2N_{RFP}$ radio frames.

A group index $i_{group} \in \{0, \ldots, N_{group}-1\}$ defines the allocated RIM-RS group within the radio frame pair.

A set of RIM-RS sequence IDs $i_{seq}^{(0)}, \ldots, i_{seq}^{N_{RS}^{(group)}-1}$ defines the allocated RIM-RS sequence for each RIM-RS transmission occasion within the RIM-RS burst, where $i_{seq}^{(k)} = \{0, \ldots, N_{seq}-1\}$, $k=0, \ldots, N_{RS}^{(group)}-1$ The above indexes are mapped to the gNB set ID as $i_{set} = (N_{seq})^{N_{RS}^{(group)}} N_{group} \cdot i_{RFP} + (N_{seq})^{N_{RS}^{(group)}} \cdot i_{group} + \Sigma_{k=0}^{N_{RS}^{(group)}-1} (N_{seq})^k \cdot i_{seq}^{(k)}$, or by directly mapping the indices $i_{RFP}$, $i_{group}$, $i_{seq}^{(0)}, \ldots i_{seq}^{(N_{RS}^{(group)}-1)}$ to different bits of the gNB set ID

Example of ID Space

TDD periodicity=2.5 ms
1 switching point per TDD periodicity
This leads to 8 RIM-RS transmission occasions within one RFP that are split up to carry
$N_{group}=3$
$N_{RS}^{(group)}=2$
The number of RS sequences are assumed to be $N_{seq}=8$
The RS periodicity is assumed to be 30 sec, hence $N_{RPF}=1500$.
This gives rise to $(N_{seq})^{N_{RS}^{(group)}} N_{group} N_{RPF} = 288000$ gNB set IDs (carried by 19 bits)

CONCLUSIONS

In the previous sections the following observations were made:

Observation 1 All NR TDD periodicities must divide 20 ms evenly, hence 20 ms time interval can be used as reference points regardless of TDD configuration to derive possible RIM-RS transmission occasions Based on the discussion in the previous sections the following are proposed:

Proposal 1 The RIM-RS transmission configuration depends only on the "gNB set ID"

Proposal 2 The RIM-RS transmission should be configurable so it can be tailored toward different network implementations Proposal 3 The RIM-RS is to be transmitted in the OFDM symbol(s) immediately preceding the 1st reference point (the DL transmission boundary)

Proposal 4 Each DL/UL switching point within a P ms or P1+P2 ms TDD periodicity constitutes a possible RIM-RS transmission occasion in time Proposal 5 In a RIM-RS transmission occasion, one out of Nseq RIM-RS sequences can be transmitted, where Nseq is configurable by the network Proposal 6 A number NRS(group) consecutive RIM-RS transmission occasions constitute a RIM-RS group. A gNB set would transmit a RIM-RS on all occasions of the RIM-RS group, with a separate sequence for each occasion.

Proposal 7 Define a radio frame pair as two subsequent radio frames. Each radio frame pair contains Ngroup consecutive RIM-RS groups, which is configurable by the network.

Proposal 8 Define the RIM-RS duty cycle as Tduty=NRFP·20·10−3 s, i.e. consisting of NRFP radio frame pairs Proposal 9 The parameters (Nseq, NRS(group), Ngroup NRFP) constitute a RIM-RS framework configuration and is configured to the gNB by the network for RIM-RS transmission/reception.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for remote interference identification, the network node comprising processing circuitry configured to:
   cause transmission of a repetition set of remote interference management-reference signals, RS RIM-RSs, in a plurality of time occasions within a remote interference management-reference signal, RIM-RS, duty cycle based at least in part on a same RS sequence being repeated for each of the plurality of time occasions, an identifier of the network node being mapped to the same RS sequence and the plurality of time occasions, and the identifier of the network node being one of a number of possible identifiers for identifying network nodes configured with RIM-RS transmission occasions within the RIM-RS duty cycle.

2. The network node of claim 1, wherein the network node is a victim network node that receives interference from downlink transmissions of another network node.

3. The network node of claim 1, wherein the identifier is identifiable from the same RS sequence and the plurality of time occasions.

4. The network node of claim 1, wherein the processing circuitry is further configured to:
   detect remote interference from another network node, the transmission of the repetition set of RIM-RSs being in response to the detected remote interference.

5. The network node of claim 4, wherein the processing circuitry is further configured to, after the transmission of the repetition set of RIM-RSs:
   determine whether remote interference is still being detected;
   if the determination is that remote interference is still detected, cause at least one additional transmission of the repetition set of RIM-RSs; and
   if the determination is that remote interference is not being detected, cease transmission of the at least one RS the repetition set of RIM-RSs.

6. The network node of claim 1, wherein each time occasion of the plurality of time occasions corresponds to at least one of:
- at least one slot where there is a switch between downlink transmission and uplink transmission; and
- a fixed time location within a slot.

7. A first network node comprising processing circuitry configured to:
- receive, for remote interference identification, a repetition set of remote interference management-reference signals, RIM-RSs, during a plurality of time occasions within a remote interference management-reference signal, RIM-RS, duty cycle, each RIM-RS in the repetition set including a same RS sequence repeated for each of the plurality of time occasions; and
- determine an identifier of a second network node based at least in part on the same RS sequence and the plurality of time occasions, the identifier of the second network node being mapped to the same RS sequence and the plurality of time occasions, and the identifier of the second network node being one of a number of possible identifiers for identifying network nodes configured with RIM-RS transmission occasions within the RIM-RS duty cycle.

8. The first network node of claim 7, wherein the processing circuitry is further configured to perform at least one remote interference mitigation action based at least in part on the determined identifier of the second network node.

9. The first network node of claim 8, wherein the processing circuitry is further configured to, after the at least one remote interference mitigation action is performed:
- determine whether a RIM-RS of the repetition set of RIM-RSs is detected; and
- if the determination is that no RIM-RS of the repetition set of RIM-RSs is detected, modify the remote interference mitigation action.

10. The first network node of claim 7, wherein the first network node is an aggressor network node that causes interference at the second network node.

11. The first network node of claim 7, wherein the identifier is identifiable from the same RS sequence and the plurality of time occasions.

12. The first network node of claim 7, wherein each time occasion of the plurality of time occasions corresponds to at least one of:
- at least one slot where there is a switch between downlink transmission and uplink transmission; and
- a fixed time location within a slot.

13. A method implemented in a network node for remote interference identification, the method comprising:
- causing transmission of a repetition set of remote interference management-reference signals, RIM-RSs, in a plurality of time occasions within a remote interference management-reference signal, RIM-RS, duty cycle based at least in part on a same RS sequence being repeated for each of the plurality of time occasions, wherein an identifier of the network node is mapped to the same RS sequence and the plurality of time occasions and wherein the identifier of the network node is one of a number of possible identifiers for identifying network nodes configured with RIM-RS transmission occasions within the RIM-RS duty cycle.

14. The method of claim 13, wherein the identifier is identifiable from the same RS sequence and the plurality of time occasions.

15. The method of claim 13, further comprising detecting remote interference from another network node, the transmission of the repetition set of RIM-RSs being in response to the detected remote interference.

16. The method of claim 15, further comprising, after the transmission of the repetition set of RIM-RSs:
- determining whether remote interference is still being detected;
- if the determination is that remote interference is still detected, causing at least one additional transmission of the repetition set of RIM-RSs; and
- if the determination is that remote interference is not being detected, ceasing transmission of the repetition set of RIM-RSs.

17. The method of claim 13, wherein each time occasion of the plurality of time occasions corresponds to at least one of:
- at least one slot where there is a switch between downlink transmission and uplink transmission; and
- a fixed time location within a slot.

18. A method implemented by a first network node, the method comprising:
- receiving, for remote interference identification, a repetition set of remote interference management-reference signals, RIM-RSs, during a plurality of time occasions within a remote interference management-reference signal, RIM-RS, duty cycle, each RIM-RS in the repetition set including a same RS sequence repeated for each of the plurality of time occasions; and
- determining an identifier of a second network node based at least in part on the same RS sequence and the plurality of time occasions, wherein the identifier of the second network node is mapped to the same RS sequence and the plurality of time occasions and wherein the identifier of the second network node is one of a number of possible identifiers for identifying network nodes configured with RIM-RS transmission occasions within the RIM-RS duty cycle.

19. The method of claim 18, further comprising performing at least one remote interference mitigation action based at least in part on the determined identifier of the second network node.

20. The method of claim 19, further comprising, after the at least one remote interference mitigation action is performed:
- determining whether a RIM-RS of the repetition set of RIM-RSs is detected; and
- if the determination is that no RIM-RS of the repetition set of RIM-RSs is detected, modifying the remote interference mitigation action.

21. The method of claim 18, wherein the identifier is identifiable from the same RS sequence and the plurality of time occasions.

22. The method of claim 18, wherein each time occasion of the plurality of time occasions corresponds to at least one of:
- at least one slot where there is a switch between downlink transmission and uplink transmission; and
- a fixed time location within a slot.

* * * * *